(12) United States Patent
Gallmetzer et al.

(10) Patent No.: US 12,358,181 B2
(45) Date of Patent: Jul. 15, 2025

(54) PLANT FOR PRODUCING A CONCRETE PREFABRICATED COMPONENT

(71) Applicant: Progress Maschinen & Automation AG, Brixen (IT)

(72) Inventors: Andreas Gallmetzer, Kaltern (AT); Karl Enderes, Brixen (AT)

(73) Assignee: PROGRESS MASCHINEN & AUTOMATION AG, Brixen (IT)

( * ) Notice: Subject to any disclaimer, the term of this patent is extended or adjusted under 35 U.S.C. 154(b) by 100 days.

(21) Appl. No.: 18/108,396

(22) Filed: Feb. 10, 2023

(65) Prior Publication Data

US 2023/0191655 A1   Jun. 22, 2023

Related U.S. Application Data

(63) Continuation of application No. PCT/EP2021/072529, filed on Aug. 12, 2021.

(30) Foreign Application Priority Data

Aug. 13, 2020 (AT) .................................. 50679/2020

(51) Int. Cl.
*B28B 1/00* (2006.01)
*B28B 15/00* (2006.01)
(Continued)

(52) U.S. Cl.
CPC .............. *B28B 1/001* (2013.01); *B28B 15/00* (2013.01); *B33Y 10/00* (2014.12); *B33Y 30/00* (2014.12)

(58) Field of Classification Search
CPC ...................................................... B28B 1/001
See application file for complete search history.

(56) References Cited

U.S. PATENT DOCUMENTS 10,486,330 B2   11/2019   Giles
10,632,732 B2   4/2020    El-Siblani et al.
(Continued)

FOREIGN PATENT DOCUMENTS

DE   10 2014 011 420   7/2015
EP   2 119 541          11/2009
(Continued)

OTHER PUBLICATIONS

International Search Report issued Jul. 25, 2022 in International (PCT) Application No. PCT/EP2021/072529.
(Continued)

*Primary Examiner* — Timothy Kennedy
(74) *Attorney, Agent, or Firm* — Wenderoth, Lind & Ponack, L.L.P.

(57) ABSTRACT

A plant for producing a concrete prefabricated component includes a plurality of stations, a transport system to transport the production pallet through the plant, and a 3D printing station having a layer depositing device for depositing a particulate aggregate on the production pallet and having a printing head for controlled delivery of a water-binder mixture. The plant also includes a storage device to store particulate aggregate, a conveying device to convey the particulate aggregate to the layer depositing device of the 3D printing station, a mixing device for mixing the water-binder (Continued)

mixture, a feed device to feed the water-binder mixture to the printing head, and an unpacking station in which a concrete prefabricated component printed in the 3D printing station on the production pallet can be unpacked from an unbound particulate aggregate.

27 Claims, 14 Drawing Sheets

(51) Int. Cl.
  *B33Y 10/00* (2015.01)
  *B33Y 30/00* (2015.01)

(56) References Cited

U.S. PATENT DOCUMENTS

| | | | |
|---|---|---|---|
| 10,688,683 | B2 | 6/2020 | Giles |
| 2005/0280185 | A1 | 12/2005 | Russell et al. |
| 2010/0025349 | A1* | 2/2010 | Khoshnevis ............ B25J 9/026 |
| | | | 212/324 |
| 2017/0129134 | A1 | 5/2017 | Colombo et al. |
| 2017/0203468 | A1 | 7/2017 | Sherman et al. |
| 2018/0071949 | A1 | 3/2018 | Giles |
| 2018/0126668 | A1 | 5/2018 | El-Siblani et al. |
| 2019/0061237 | A1* | 2/2019 | Kimblad ............... B29C 64/393 |
| 2019/0168443 | A1 | 6/2019 | Wohlgemuth |
| 2020/0061866 | A1 | 2/2020 | Giles |
| 2021/0107177 | A1 | 4/2021 | Giles |
| 2022/0347739 | A1 | 11/2022 | Hascoët et al. |

FOREIGN PATENT DOCUMENTS

| | | |
|---|---|---|
| WO | 2018/024836 | 2/2018 |
| WO | 2019/092169 | 5/2019 |
| WO | 2019/197088 | 10/2019 |
| WO | 2020/011734 | 1/2020 |

OTHER PUBLICATIONS

"Particle-Bed 3D Printing by Selective Cement Activation (SCA)—Particle Surface Funtionalisation, Particle-Bed Compaction and Reinforcement Implementation", www.tn-braunschweig.de/fileadmin/Redaktionsgruppen/Forschung/TRR277/Proiect_Poster/190919_A01_Poster_Vorlage_neu_EH6.pdf "Additive manufacturing in concrete construction—current trends and challenges", Mar. 2020, BFT International, www.bft-international.com/en/artikel/bft_Additive_manufacturing_in_concrete_construction_current_trends_and_3504754.html.

"TRR277 A02—Particle-Bed 3D Printing by Selective Cement Paste Intrusion (SPI)—Particle Surface Functionalisation, Particle Synthesis and Integration of WAAM Reinforcement", Jan. 2021, Institute for Machine Tools and Industrial Management, TUM Department of Mechanical Engineering and Technical University of Munich, https://www.mw.tum.de/en/iwb/research-and-industry/current-projects/additive-manufacturing/trr277-a02-particle-bed-3d-printing-by-selective-cement-paste-intrusion-spi-particle-surface-functionalisation-particle-synthesis-and-integra-tion-of-waam-reinforcement/.

Weger, Daniel et al., "Reinforced Particle-Bed Printing by Combination of the Selective Paste Intrusion Method with Wire and Arc Additive Manufacturing—A First Feasibility Study", RILEM International Conference on Concrete and Digital Fabrication, 2020, https://link.springer.com/chapter/10.1007/978-3-030-49916-7_95.

"Additive Fertigung von Betonstrukturen mit der Selective Paste Intrusion—SPI" (with English language Abstract), https://mediatum.ub.tum.de/doc/1540336/1540_336.pdf.

Weger, Daniel et al., "Penetration of Cement Pastes into Particle-Beds: A Comparison of Penetration Models", Materials, Jan. 2021, www.ncbi.nlm.nih.gov/pmc/articles/PMC7829847.

Weger, Daniel et al., "Reinforced Particle-Bed Printing by Combination of the Selective Paste Intrusion Method with Wire and Arc Additive Manufacturing—A First Feasibility Study", RILEM International Conference on Concrete and Digital Fabrication, 2020, www.textstrahl.de/fileadmin/textstrahl/content/galerie/Dokumente/Feature_3D~Druck_BrittaUhl_web.pdf.

* cited by examiner

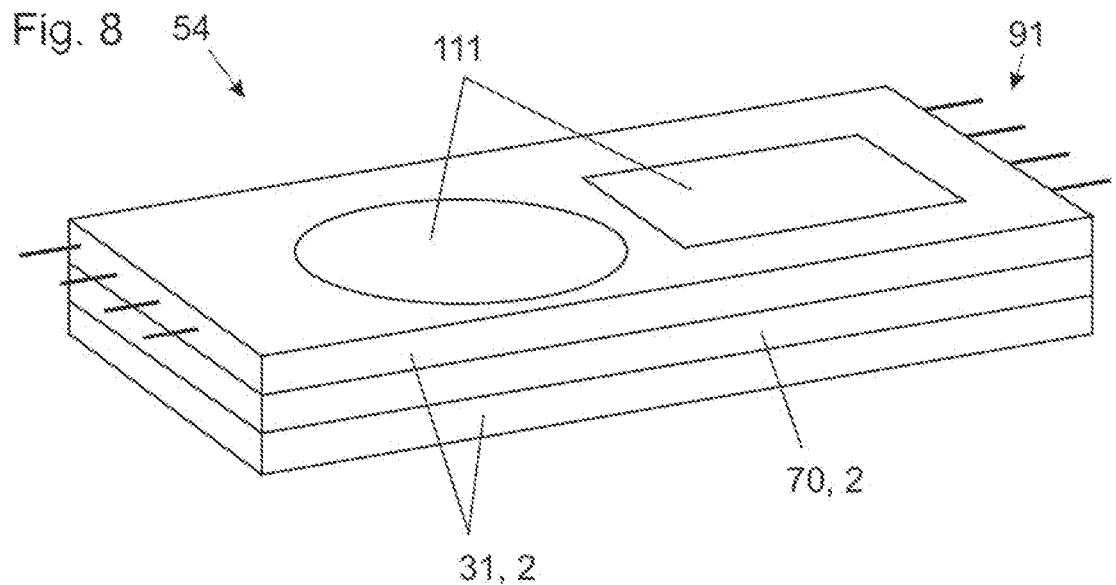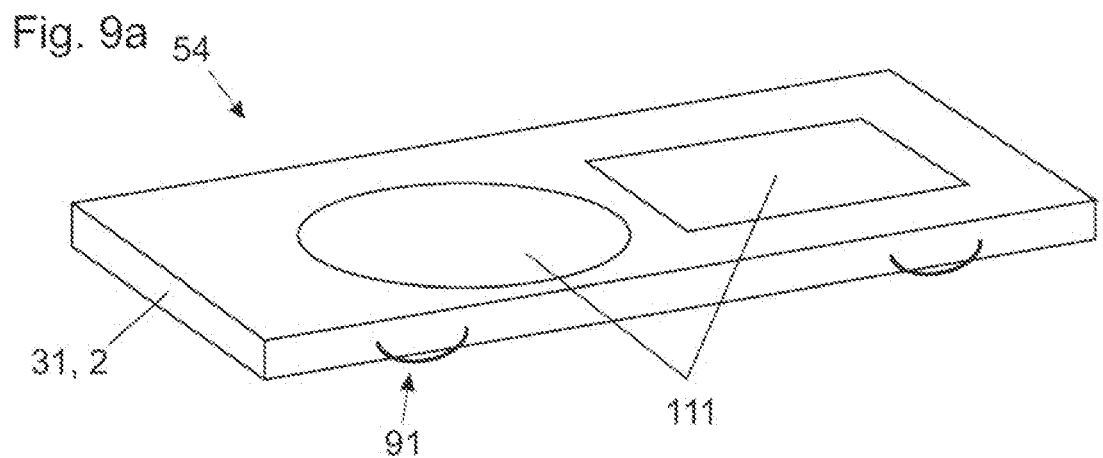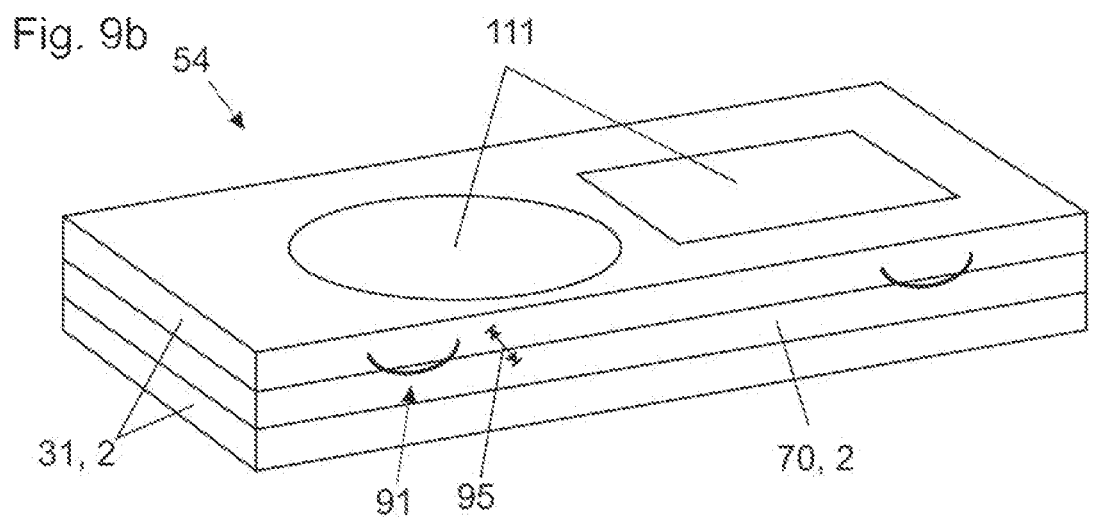

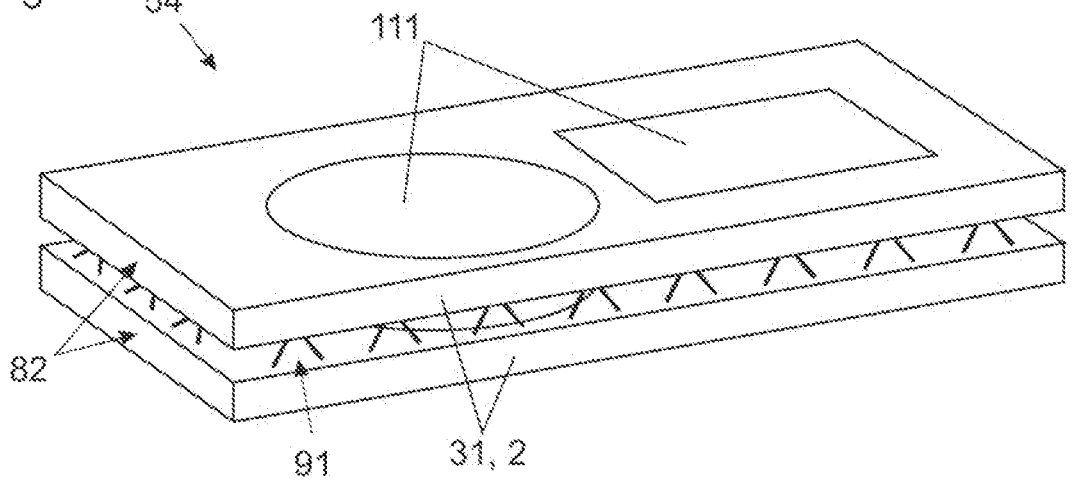
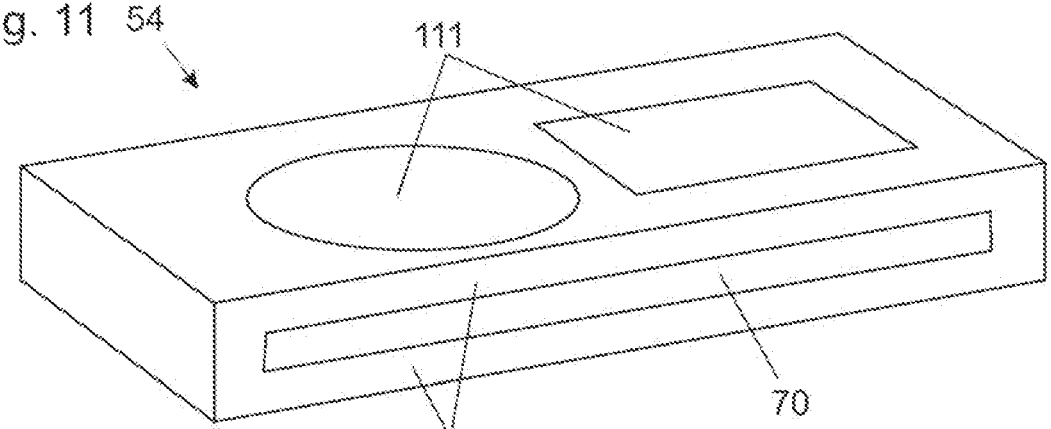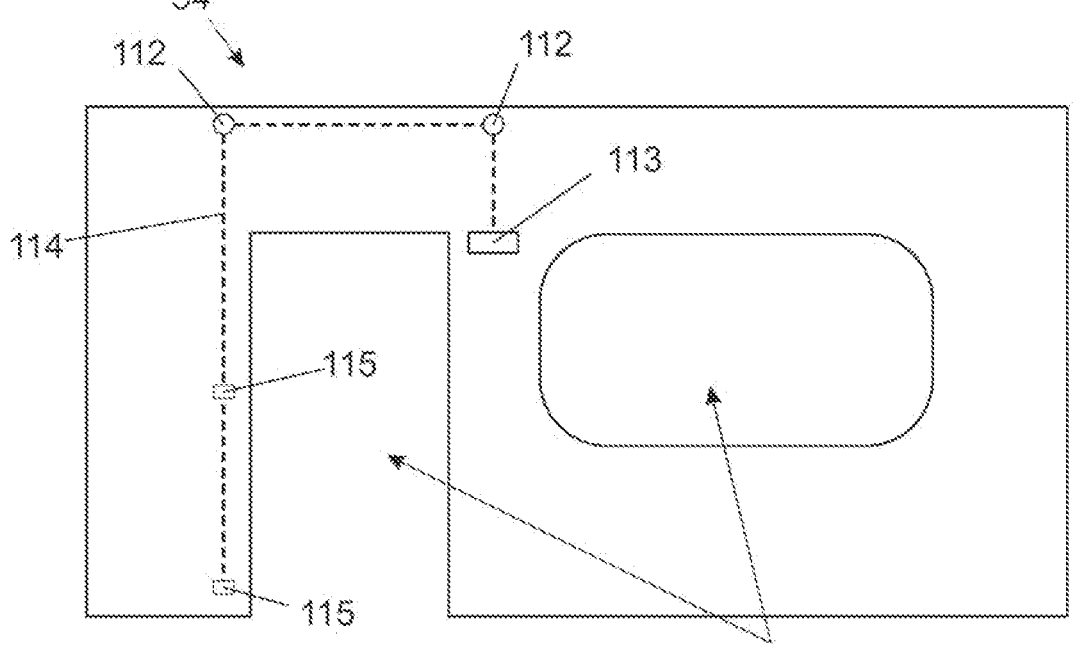

Fig. 21a
Fig. 21b
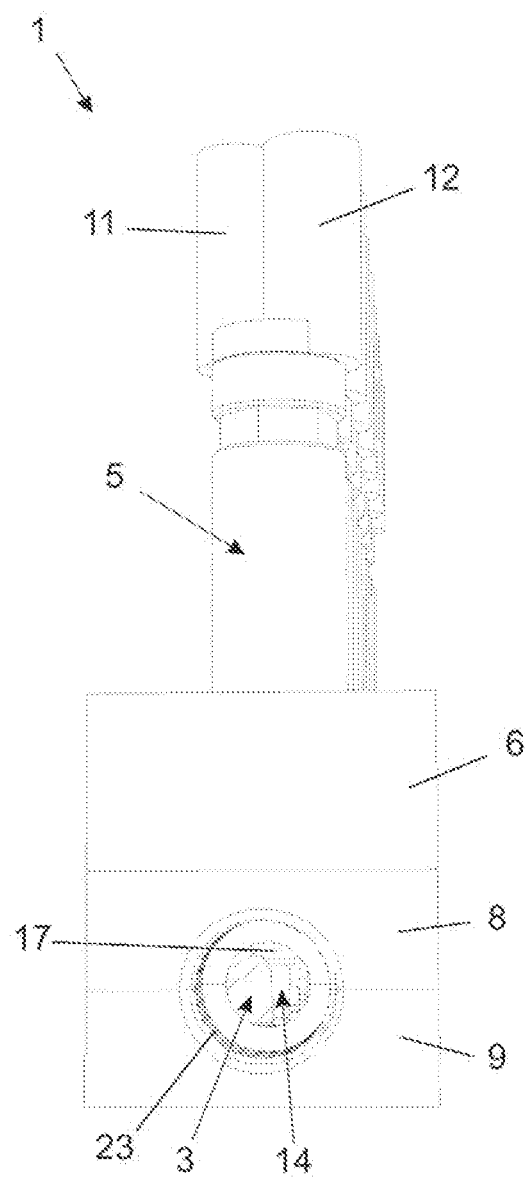
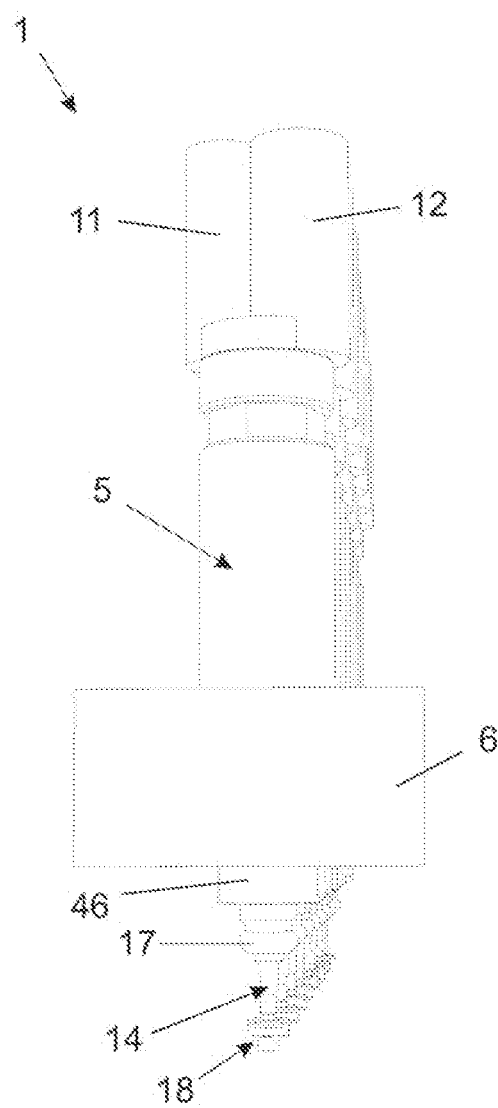

Fig. 23
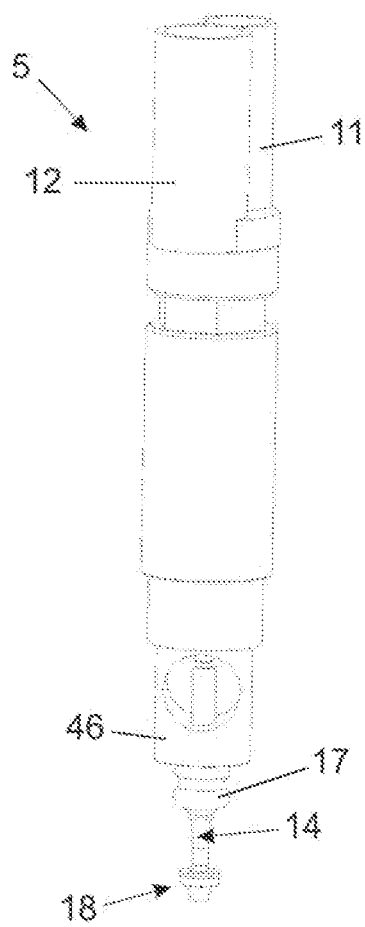
Fig. 24a
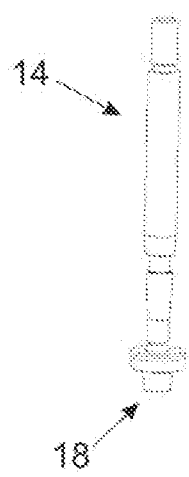
Fig. 24b
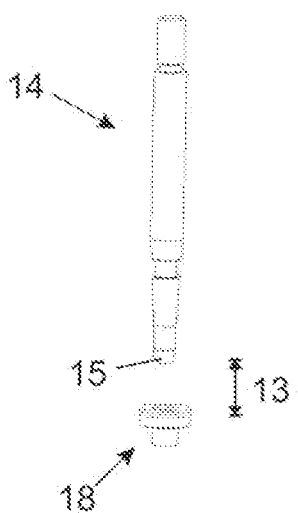
Fig. 25
Fig. 26
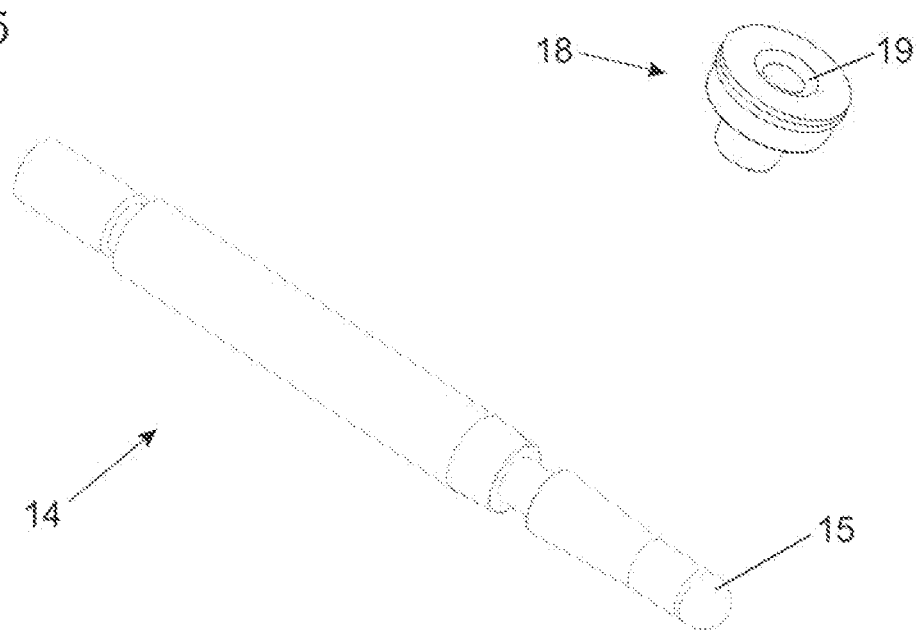

PLANT FOR PRODUCING A CONCRETE PREFABRICATED COMPONENT

BACKGROUND OF THE INVENTION

The invention relates to a plant for producing a, preferably flat, concrete prefabricated component, comprising several stations, through which at least one production pallet can pass, in particular in a circulating manner. The plant comprises at least one transport system, with which the at least one production pallet can be transported through the plant. The invention furthermore relates to a method for producing a, preferably flat, concrete prefabricated component by such a plant.

Circulation plants in which wet concrete is processed into concrete prefabricated components with the aid of formwork units are known from the state of the art. The use of formwork units is associated with a number of disadvantages: It is necessary to delimit not only side faces of a concrete prefabricated component to be produced with formwork units, but also e.g. window block-outs by special installation frames. Moreover, post-formwork operations are necessary. The stations of the circulation plant being used in connection with the formwork stations, such as e.g. formwork robots, are expensive and complex. The shapes that can be achieved with formworks are limited. Some shapes which would actually be desirable cannot be achieved at all.

Further disadvantages of the circulation plants known from the state of the art are that non-recyclable material is often used, which has to be disposed of. Recesses for electric and sanitary equipment can be achieved, if at all, only with a very great effort during the production of a concrete prefabricated component. The necessary compaction processes are often associated with a high noise nuisance.

In addition to the conventional plants, in which wet concrete is processed, there are approaches from the state of the art which are based on the method of Selective Cement Activation (SCA). However, these approaches also have a number of disadvantages: A base material to be processed has to be mixed with a binder component. A base material not solidified in the course of a printing process, however, then cannot readily be further used later. Some materials, such as insulation materials, cannot be used at all. In the case of the materials that can be used, as a rule an unfavorable dust formation results, which requires a complex unpacking station with extraction systems. Furthermore, the printed components are not water-resistant during the processing of Sorel cement and have a low, and thus in many cases insufficient, strength compared with concrete. And finally, authorizations have to be specifically obtained for the printed components, as they do not meet the existing standards because of the base materials used.

SUMMARY OF THE INVENTION

The object of the present invention is to at least partially remedy these disadvantages and to specify a plant, improved compared with the state of the art, for producing a, preferably flat, concrete prefabricated component in which in particular the use of formwork units can be dispensed with. Moreover, a method, improved compared with the state of the art, for producing a, preferably flat, concrete prefabricated component by such a plant is to be specified.

In the plant according to the invention, therefore, the plant comprises:

at least one 3D printing station with at least one layer depositing device for depositing, in layers, at least one particulate aggregate on the at least one production pallet and at least one printhead for the controlled delivery of at least one water-binder mixture, comprising water and at least one hydraulic binder, in particular a cement-based binder, at at least one locally predetermined region of the production pallet and/or a layer of the at least one aggregate deposited on the production pallet by the at least one layer depositing device, at least one storage device, in which the at least one particulate aggregate can be stored, at least one conveying device, with which the at least one particulate aggregate stored in the at least one storage device can be conveyed to the at least one layer depositing device of the at least one 3D printing station, the at least one water-binder mixture, wherein the at least one water-binder mixture contains water and at least one hydraulic binder, in particular a cement-based binder, at least one mixing device, with which the at least one water-binder mixture can be provided, at least one feed device, with which the at least one water-binder mixture provided by the at least one mixing device can be fed to the at least one printhead of the at least one 3D printing station, and at least one unpacking station, in which a concrete prefabricated component printed on the at least one production pallet in the at least one 3D printing station can be unpacked (separated) from an unbound particulate aggregate.

Compared with the plants known from the state of the art, in which wet concrete is processed into concrete prefabricated components with the aid of formwork units, the plant according to the invention has a number of advantages:

expensive and complex stations, such as formwork robots, and the associated formwork parts and magnets can be dispensed with;

flat elements, such as wall elements or ceiling elements, can be produced accurately fitting and without formwork effort;

window block-outs can be achieved without formwork effort;

any desired free forms can be achieved;

post-formwork operations and the use of non-recyclable material can be dispensed with entirely;

openings and slits, printed "conduits" and printed "sockets" for electric and sanitary equipment can be provided for directly without additional effort and the use of plastics;

weight-reducing cavities can be printed directly;

no additional compaction is needed, as the application of the particulate aggregate is effected in layers;

a low water-cement factor is possible, which results in a minimal consumption of cement;

the production can be effected on a mobile production pallet;

as an alternative or supplement to this, a production in which several production pallets are provided in series and the at least one printhead and the at least one layer depositing device are moved over the production pallets is possible;

production on a long track is equally possible, wherein in this case the at least one printhead and the at least one layer depositing device are also moved over the production pallets;

a production within the framework of a circulation plant can be achieved, whereby drying racks, lift stations with and without tilting device, cleaning station, oiling station from the standard program of a circulation supplier and standard guidance and control systems of a circulation plant can be used;

the degree of automation can be further increased, namely from design to production;

the planning of a concrete prefabricated component proves to be simpler, as a fully digitized planning for a batch size of 1 is possible;

complex planning operations are dispensed with; and less storage space is needed for consumables.

Compared with the use of an SCA printer, the plant according to the invention likewise has a number of advantages:

the powder bed only consists of particulate aggregates, such as e.g. sand, brick chips, Liapor, expanded clay, which have been known in the construction industry for decades;

various materials, such as e.g. insulation materials, can be easily used;

the base material is not mixed with a binder, which has the result that an unbound material can be easily re-used;

the water-binder mixture is selectively applied, not activated;

if cement is used in the water-binder mixture, residues can be easily broken, sieved and used again;

the print volume available need not be optimally filled;

a complex unpacking station with extraction systems is not necessary, as the dust formation is significantly less;

an application of one or more first and last layers of the water-binder mixture opens up the possibility of smooth surfaces which can otherwise be achieved only by a formwork or by a screeding, but in no case by an SCA printer;

the particulate aggregates that can be used are resistant to water;

the components that can be produced have a much higher strength;

Portland cement can be used, with the result that valid authorizations and standards can be utilized; and the material costs are lower.

As stated at the beginning, protection is also sought for a method for producing a, preferably flat, concrete prefabricated component by a plant according to the invention, wherein the method comprises the following method steps:

in the at least one 3D printing station, at least one layer of the at least one particulate aggregate is deposited on the production pallet by the at least one layer depositing device in a first printing method step and a predetermined dose of the at least one water-binder mixture is delivered at least one locally predetermined region of the at least one layer of the at least one aggregate by the at least one printhead in a second printing method step, preferably wherein the two printing method steps are repeated and/or carried out in reverse order, the at least one particulate aggregate is conveyed from the at least one storage device to the at least one layer depositing device of the at least one 3D printing station by the at least one conveying device, the at least one water-binder mixture is provided in the at least one mixing device and fed to the at least one printhead of the at least one 3D printing station by the at least one feed device, the at least one production pallet is transported from the at least one 3D printing station to the at least one unpacking station by the at least one transport system, and a concrete prefabricated component printed on the at least one production pallet in the at least one 3D printing station is unpacked (separated) from an unbound particulate aggregate in the at least one unpacking station.

BRIEF DESCRIPTION OF THE DRAWINGS

Further details and advantages of the invention are explained in more detail below with the aid of the description of the figures, in which:

FIG. 8 shows a further embodiment of a printed concrete prefabricated component in a schematically represented perspective view, FIGS. 9a, b show further embodiments of a printed concrete prefabricated component in schematically represented perspective views, FIG. 10 shows a further embodiment of a printed concrete prefabricated component in the form of a double wall in a schematically represented perspective view, FIG. 11 shows a further embodiment of a printed concrete prefabricated component with an insulation layer in a schematically represented perspective view, FIG. 12 shows a further embodiment of a printed concrete prefabricated component with printed block-outs and in-wall conduits for electrical wires in a schematically represented perspective view, FIGS. 13a, ba show a first embodiment of a production pallet in a schematically represented top view, FIGS. 14a, ba show a further embodiment of a production pallet in a schematically represented top view in sub-figure a and in a cross-sectional view from the side in sub-figure b, FIG. 21a shows the embodiment of the printhead represented in FIG. 19 in a perspective side view, FIG. 21b shows the embodiment of the printhead represented in FIG. 21a, wherein a first and a second partial body of a removable body have been hidden, FIG. 23 shows a schematically represented embodiment of a valve of a printhead for the controlled delivery of a water-binder mixture in a perspective view, FIGS. 24a, b is an isolated representation of a valve rod of the valve represented in FIG. 23 and a nozzle body, wherein the valve rod and the nozzle body are in contact in sub-figure a and the valve rod and the nozzle body are spaced apart from each other in sub-figure b, FIG. 25 is an isolated representation of a valve rod of the valve represented in FIG. 23, and FIG. 26 is an isolated representation of a nozzle body of the valve represented in FIG. 23.

DETAILED DESCRIPTION OF THE INVENTION

Figure 1:
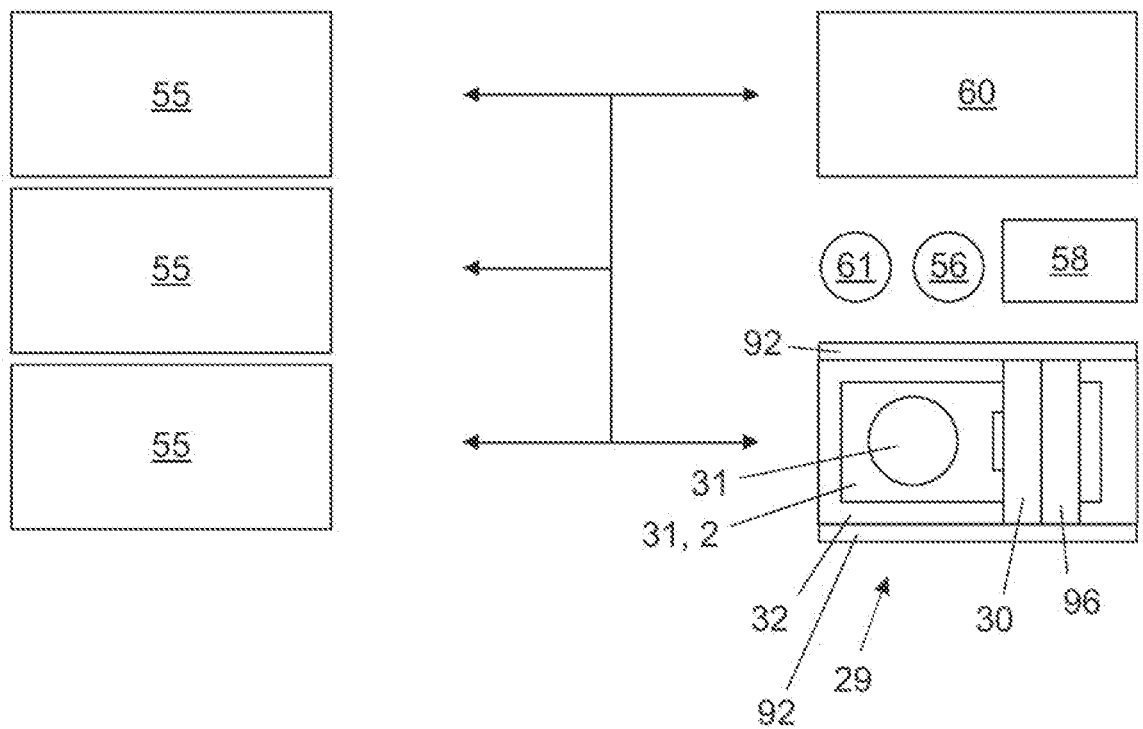
FIG. 1 shows a first embodiment of a plant for producing a concrete prefabricated component in a schematically represented view.

FIG. 1 shows a first embodiment of a plant 53 for producing a, preferably flat, concrete prefabricated component 54, comprising several stations, through which at least one production pallet 32 can pass, wherein the plant 53 comprises at least one transport system, with which the at least one production pallet 32 can be transported through the plant 53. The transport routes, covered in the process, between the stations are indicated by arrows.

The plant 53 furthermore comprises at least one 3D printing station 29 with at least one layer depositing device 30 for depositing, in layers, at least one particulate aggregate 31 on the at least one production pallet 32 and at least one printhead 1 for the controlled delivery of at least one water-binder mixture 2, comprising water and at least one hydraulic binder, in particular a cement-based binder, at least one locally predetermined region 33 of the production pallet 32 and/or a layer 34, 35, 36 of the at least one aggregate 31 deposited on the production pallet 32 by the at least one layer depositing device 30.

At least one storage device 56 is provided, in which the at least one particulate aggregate 31 can be stored.

As follows from FIG. 5, at least one conveying device 57 can be provided, with which the at least one particulate aggregate 31 stored in the at least one storage device 56 can be conveyed to the at least one layer depositing device 30 of the at least one 3D printing station 29.

The plant 53 furthermore comprises at least one mixing device 58, with which the at least one water-binder mixture 2 can be provided.

As follows from FIG. 5, at least one feed device 59 can be provided, with which the at least one water-binder mixture 2 provided by the at least one mixing device 58 can be fed to the at least one printhead 1 of the at least one 3D printing station 29.

The plant 53 comprises at least one unpacking station 60, in which a concrete prefabricated component 54 printed on the at least one production pallet 32 in the at least one 3D printing station 29 can be unpacked (separated) from an unbound particulate aggregate 31.

And finally in the specifically represented embodiment the plant 53 comprises holding areas 55 for the at least one production pallet 32.

A substantial advantage of the plant 53 is that formworks and the associated formwork management, such as a formwork robot, a cleaning station or a magazine, can be dispensed with. There is also no need for a concrete spreader and a smoothing device, which are used in conventional circulation plants for producing concrete prefabricated elements.

By such a plant 53, a method for producing a, preferably flat, concrete prefabricated component 54 can be carried out as follows:

In the at least one 3D printing station 29, at least one layer 34, 35, 36 of the at least one particulate aggregate 31 is deposited on the production pallet 32 by the at least one layer depositing device 30 in a first printing method step and a predetermined dose 49 of the at least one water-binder mixture 2 is delivered at least one locally predetermined region 33 of the at least one layer 34, 35, 36 of the at least one aggregate 31 by the at least one printhead 1 in a second printing method step, preferably wherein the two printing method steps are repeated and/or carried out in reverse order.

At least one outside of the concrete prefabricated component 54 can be provided with a predetermined surface structure in the course of the printing method steps. This represents a great advantage compared with conventional production methods, as expensive shaping rubber matrices can be dispensed with. Instead, the predetermined surface structure, thus e.g. a desired pattern, is printed.

The at least one particulate aggregate 31 is conveyed from the at least one storage device 56 to the at least one layer depositing device 30 of the at least one 3D printing station 29 by the at least one conveying device 57.

The at least one water-binder mixture 2 is provided in the at least one mixing device 58 and fed to the at least one printhead 1 of the at least one 3D printing station 29 by the at least one feed device 59.

The at least one production pallet 32 is transported from the at least one 3D printing station 29 to the at least one unpacking station 60 by the at least one transport system, and a concrete prefabricated component 54 printed on the at least one production pallet 32 in the at least one 3D printing station 29 is unpacked from an unbound particulate aggregate 31 in the at least one unpacking station 60.

If the plant 53, as in the case represented, has holding areas 55 for the at least one production pallet 32, the at least one production pallet 32 is transported from the at least one holding area 55 to the at least one 3D printing station 29 by the at least one transport system in a further method step.

Figure 2:
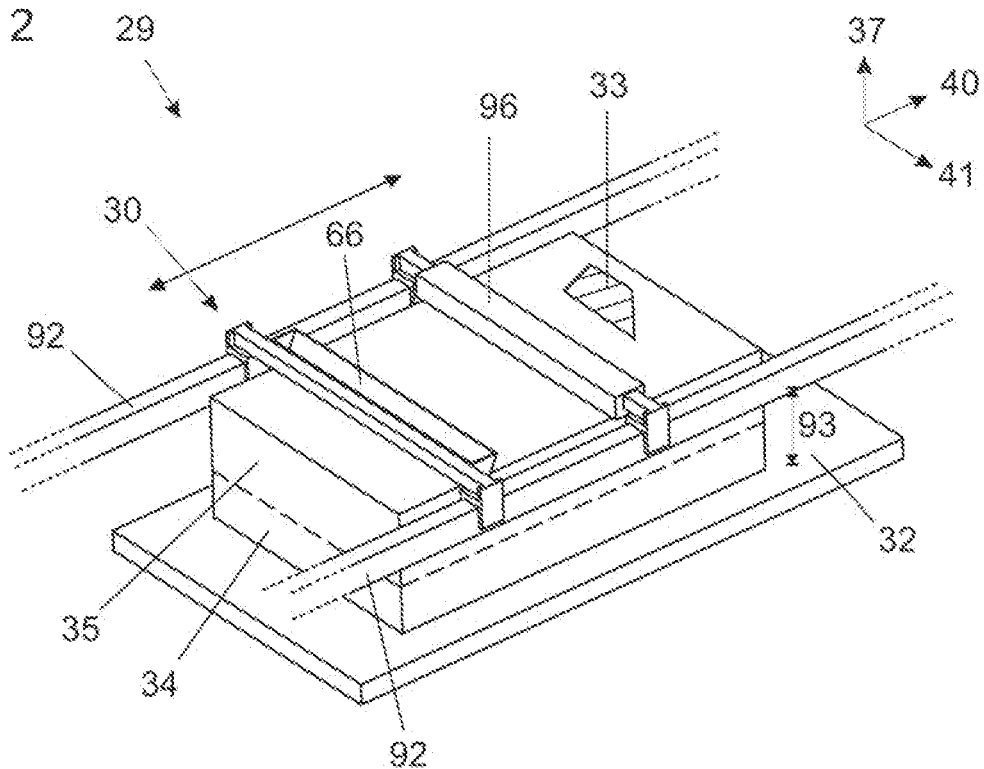
FIG. 2 shows a first embodiment of a 3D printing station in a schematically represented perspective view, FIGS. 3a, b show two further embodiments of a 3D printing station in a schematically represented top view, FIGS. 4a, b show two further embodiments of a plant for producing a concrete prefabricated component in schematically represented views.

FIG. 2 shows a first embodiment of a 3D printing station 29.

The 3D printing station 29 has at least two guide rails 92, on which the at least one layer depositing device 30 and/or the at least one printhead 1 are movable in a plane parallel to the at least one production pallet 32.

The 3D printing station 29 can comprise at least one height-adjustment device, with which a distance 93 of the at least one layer depositing device 30 or a part of the at least one layer depositing device 30 and/or the at least one printhead 1 from a production pallet 32 arranged in the at least one 3D printing station 29 is alterable in the vertical direction 37 depending on a print advancement.

The at least one printhead 1 and the at least one layer depositing device 30 have a longitudinal extent in direction 41 and are movable in a direction 40 transverse thereto along the guide rails 92, which is indicated by a double arrow. The at least one printhead 1 or constituents thereof and/or the at least one layer depositing device 30 or constituents thereof can also be movable in direction 41. It is also possible to provide more than one layer depositing device 30 and/or more than one printhead 1. The print speed can thereby be increased.

By means of the layer depositing device 30, layers 34, 35 of at least one particulate aggregate 31 can be deposited on the production pallet 32. With the aid of the printhead 1, a predetermined dose of a binder or of a water-binder mixture 2, comprising water and at least one hydraulic binder, in particular a cement-based binder, can be delivered in a controlled manner at least one locally predetermined region 33 of the production pallet 32 (for the case where no layer of the particulate aggregate 31 has yet been deposited on the production pallet 32) or a layer 34, 35 of the at least one aggregate 31 deposited on the production pallet 32 by the layer depositing device 30.

The layer depositing device 30 can, as in the case represented, have a depositing funnel 66 as intermediate storage for the at least one particulate aggregate 31.

Figure 3A:
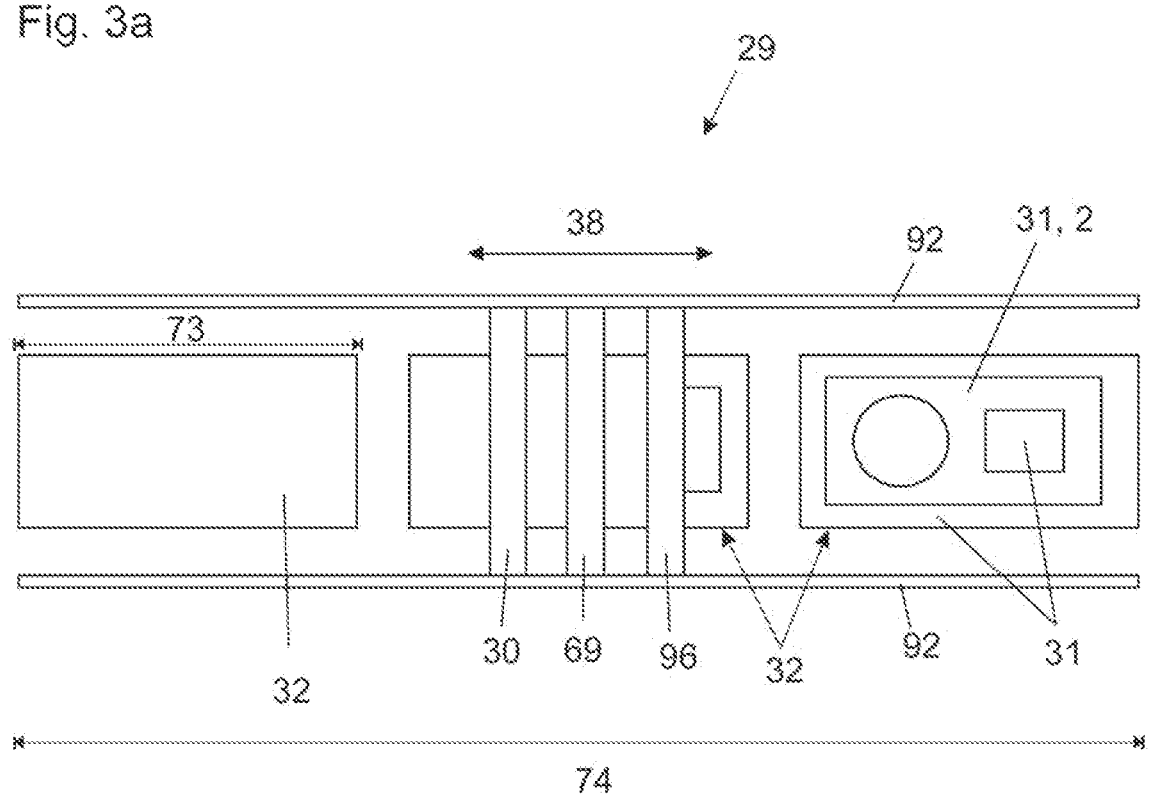
Figure 3B:
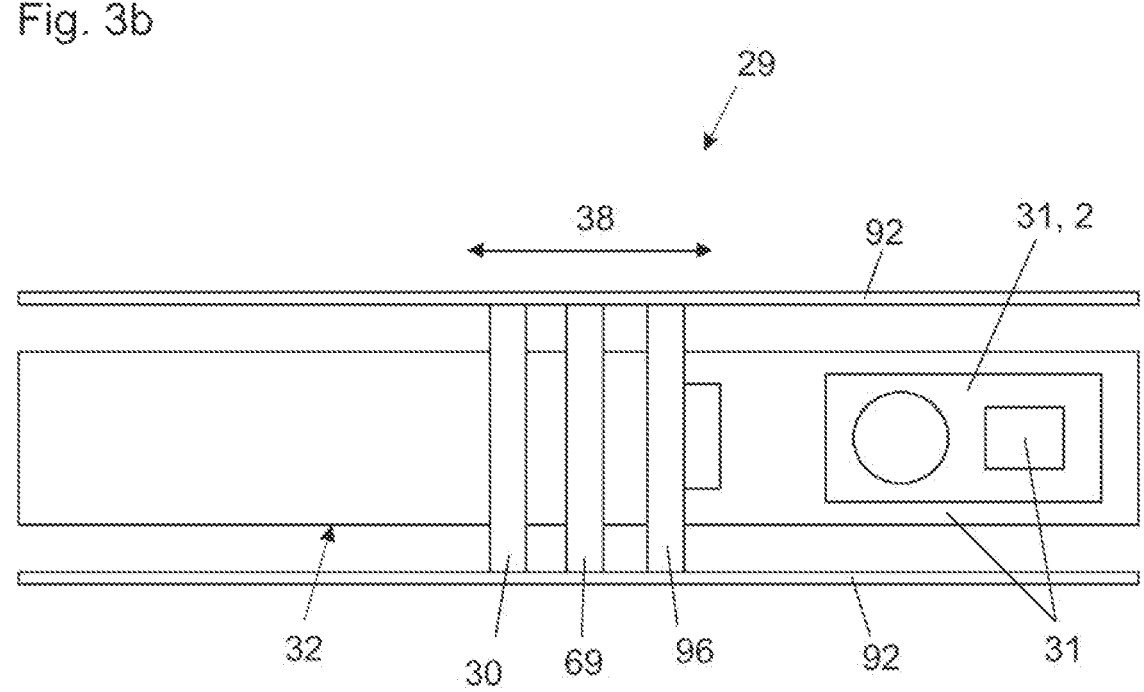

FIGS. 3a and 3b show two further embodiments of a 3D printing station 29 in a schematically represented top view, wherein the two embodiments differ in that several shorter production pallets 32, which can be arranged in series one behind another in the printing station 29, are used in the case of FIG. 3a and a long production pallet 32, on which several prefabricated components can be printed, is used in the case of FIG. 3b. The print direction 38 is marked with an arrow.

The plant 53 thus comprises at least one production pallet 32 which has a length 73, and the at least one 3D printing station 29 has a length 74, particularly preferably wherein the length 74 of the at least one 3D printing station 29 is at least twice as large as the length 73 of the at least one production pallet 32.

In comparison with the embodiment of FIG. 2, the at least one 3D printing station 29 comprises at least one further layer depositing device 69 for depositing, in layers, at least one insulation material 70. Preferably, the plant 53 comprises at least one further storage device 71, in which the at least one insulation material 70 can be stored, and at least one further conveying device 72, with which the at least one insulation material 70 stored in the at least one further storage device 71 can be conveyed to the at least one further layer depositing device 30 of the at least one 3D printing station 29 (cf. also FIG. 5). In this connection, it is appropriate that the plant 53 also comprises at least one suction device for extracting unbound particulate aggregate 31.

Figure 4A:
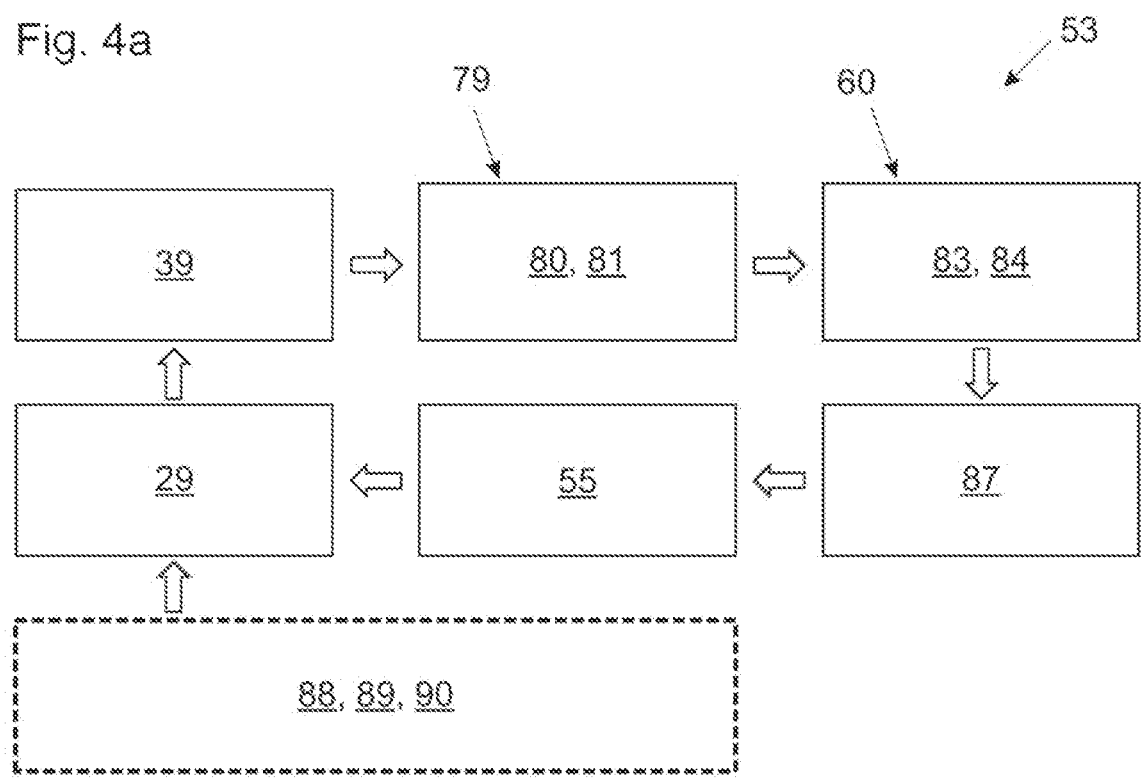
Figure 4B:
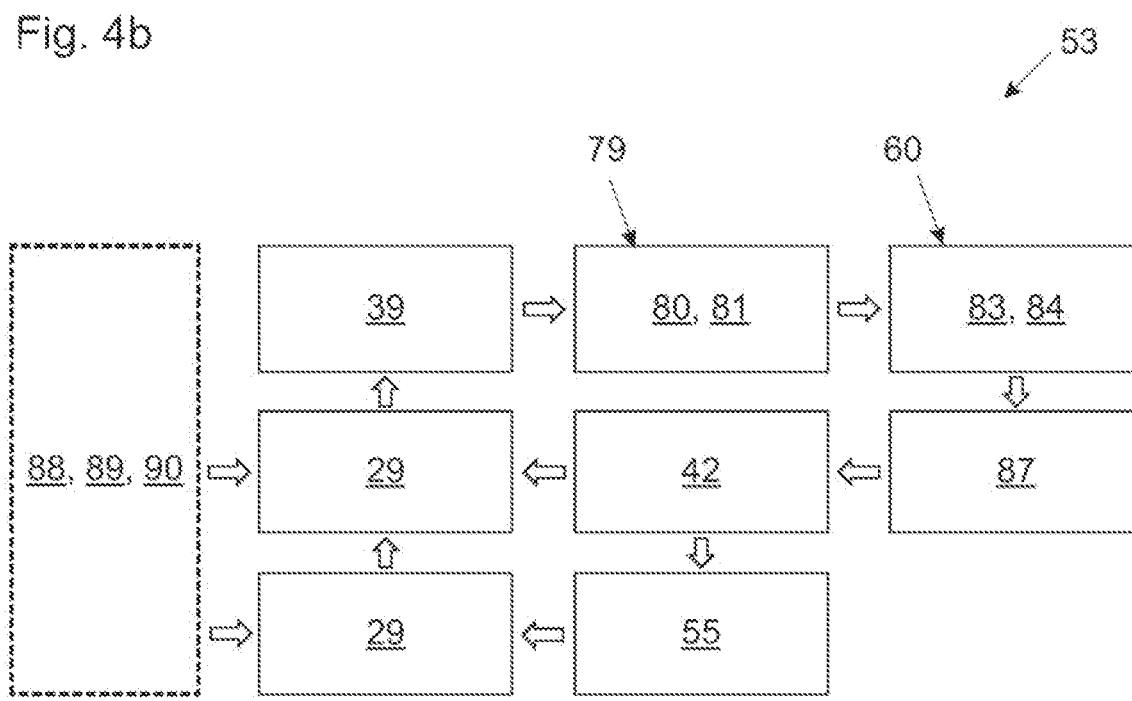

FIGS. 4a and 4b show two further embodiments of a plant 53 for producing a concrete prefabricated component. The plants 53 are designed as circulation plants, in which one or more production pallets 32 pass through the stations of the plant 53 in a circulating manner by a suitable transport system.

The plants 53 in each case have one or more holding areas 55. These can serve as intermediate storage for empty production pallets 32. From there, the production pallets 32 can be transported to one or more 3D printing stations 29. A central traverser 42 can be provided for the management of several holding areas 55.

Optionally, at least one straightening machine 88, at least one reinforcement welding device 89 and/or at least one reinforcement depositing device 90, with which at least one reinforcement 91 can be arranged on the at least one production pallet 32 arranged in the at least one 3D printing station 29, can be provided.

The plants 53 in each case have at least one drying station 79, in which the at least one production pallet 32 can be arranged in order to cure a concrete prefabricated component 54 printed on the at least one production pallet 32 in the at least one 3D printing station 29. The at least one drying station 79 comprises at least one heating device 80 and at least one pallet rack 81 in order to arrange at least two production pallets 32 one above another in the at least one drying station 79. The drying station 79 is arranged after the at least one 3D printing station 29 in the production direction.

A stacker crane 39 can be provided for the operation of the pallet rack 81.

Following the drying station 79, the production pallets 32 can be transported into an unpacking station 60. This can comprise at least one tilting device 83, and/or at least one removal device 84 for removing the unbound particulate aggregate 31.

And finally in the embodiments shown, the plants 53 in each case have at least one preparation station 87 for preparing the at least one production pallet 32. Preferably, the at least one preparation station 87 comprises at least one cleaning agent and/or release agent spraying device.

As in the first embodiment according to FIG. 1, the plants 53 are formed without formwork robots.

Figure 5:
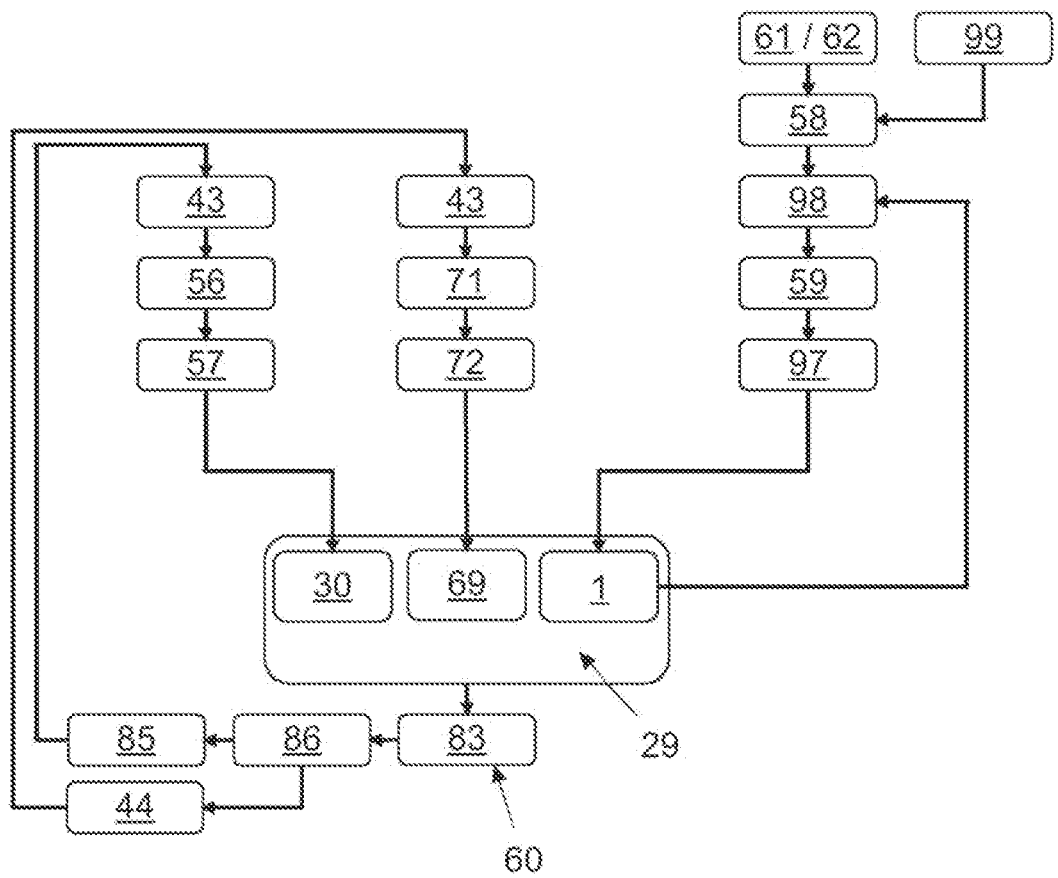
FIG. 5 is diagram of a further embodiment of a 3D printing station with the associated supply loops in a schematically represented view.

FIG. 5 shows a diagram of a further embodiment of a 3D printing station 29 with the associated supply loops.

The water-binder mixture 2 that can be delivered by the at least one printhead 1 in this case comprises water and at least one cement-based binder. The associated plant 53 comprises at least one cement storage device 61, in which cement can be stored, and/or at least one bag loading station 62 for cement bags. The at least one cement storage device 61 and/or the at least one bag loading station 62 are in cement-channeling connection with the at least one mixing device 58, with which the at least one water-binder mixture 2 can be provided.

Via a superplasticizer doser 99, at least one superplasticizer can be fed, metered, to the mixing device 58.

Following the mixing device 58, an equalizing tank 98 can be arranged, from which on the one hand the water-binder mixture 2 can be fed to at least one printhead 1 via a filter 97 by a feed device 59, e.g. in the form of a pump. On the other hand, water-binder mixture 2 that has not been applied can be fed back from the printhead 1 into the equalizing tank 98 again. It is important that the water-binder mixture 2 always remains in motion.

The layer depositing device 30 of the 3D printing station 29 is supplied with the particulate aggregate 31 to be applied from a storage device 56 by a conveying device 57, e.g. in the form of a pump. This aggregate 31 can be for example sand and/or expanded clay.

Optionally, the 3D printing station 29 can comprise a further layer depositing device 69 e.g. for applying an insulation material 70. This can analogously be supplied via a further storage device 71 and a further conveying device 72, e.g. a pump.

The supply loops of the two layer depositing devices 30 and 69 can be completed by the at least one unpacking station 60. This can have at least one separating device 86 for separating the at least one particulate aggregate 31 from at least one further substance applied to the at least one production pallet 32 by the at least one 3D printing station 29, preferably wherein the at least one separating device 86 comprises at least one sieve and/or at least one air separator.

The substances separated from each other in such a way can then be fed back into the storage devices 56 and 71, which can be e.g. a silo, in each case by a recirculation device 44 or 85 and in each case a sieve 43. The recirculation devices 44 or 85 can comprise e.g. a pump, an extraction system and/or a transport system.

Figure 6:
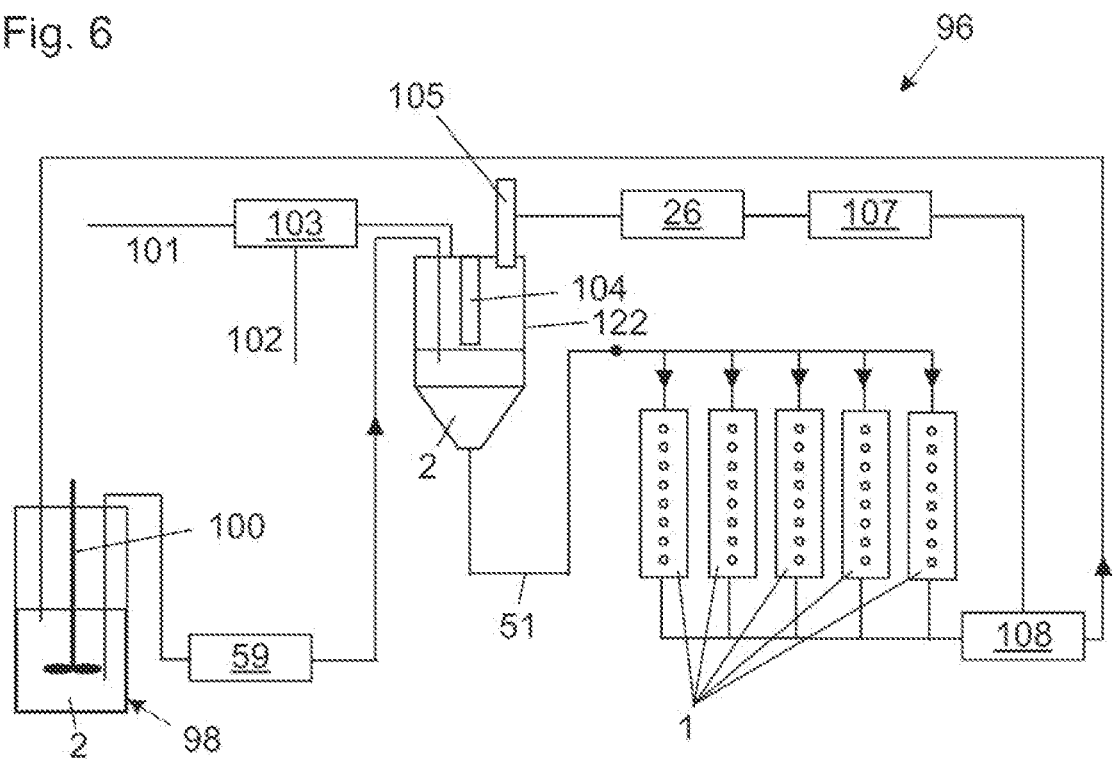
FIG. 6 is diagram of a first embodiment of a print bar in a schematically represented view.

FIG. 6 shows a diagram of a first embodiment of a print bar 96. The print bar 96 comprises several, e.g. five, printheads 1, which can be supplied with the water-binder mixture 2 in parallel via lines 51.

The supply loop comprises an equalizing tank 98. A mixing propeller 100 can be arranged in the latter.

The water-binder mixture 2 can be conveyed by a feed device 59 into an intermediate tank 122, and the intermediate tank 122 can have a flushing nozzle 104.

Furthermore, the intermediate tank 122 can be coupled with a quick exhaust valve 103, with which air can be removed from the intermediate tank 122 in an emergency, e.g. a blockage. The reference number 101 denotes the nozzle pressure, the reference number 103 denotes the outlet of the quick exhaust valve.

For pressure regulation, a pinch valve 108, a pressure regulator 107 and a level sensor 105 can be provided, which are or can be connected to a control and/or regulating device 26.

FIGS. 7a to 7d show, in four sub-steps, a first embodiment of a method for producing a prefabricated 3D-printed part, preferably concrete prefabricated component 54, for the construction industry.

The method has the following method steps:

In a first method step at least one layer 34, 35, 36 of at least one particulate aggregate 31 is deposited on a production pallet 32 by at least one layer depositing device 30.

In a second method step a predetermined dose 49 of at least one binder or at least one water-binder mixture 2 is delivered at least one locally predetermined region 33 of the at least one layer 34, 35, 36 of the at least one aggregate 31 by at least one printhead 1.

In a third method step at least one reinforcement 91 is arranged, by at least one reinforcement depositing device 90, at least in regions on and/or in at least the at least one locally predetermined region 33, at which the predetermined dose 49 of the at least one binder or the at least one water-binder mixture 2 was delivered in the course of the second method step.

In the course of the third method step at least one reinforcement 91 can be arranged in the form of a reinforcement mesh, preferably made of steel and/or plastic, or in the form of fibers, preferably glass fibers.

The first and second method steps can be repeated at least once after the third method step, and/or the first and second method steps can be carried out in reverse order.

The at least one reinforcement 91 can have at least one block-out 94 in at least one region of the at least one layer 34, 35, 36 of the at least one aggregate 31, in which the at least one binder or the at least one water-binder mixture 2 was not delivered.

In the course of the third method step the reinforcement 91 can be sunk, preferably by pressing and/or vibration, at least in regions into the locally predetermined region 33 of the at least one layer 34, 35, 36 of the at least one particulate aggregate 31, in which the predetermined dose 49 of the at least one binder or the at least one water-binder mixture 2 was delivered.

The reinforcement 91 can also be sunk in over several print layers in the course of the third method step. The reinforcement 91 also need not be completely sunk. A protrusion from the top, e.g. of 1-2 cm, is also possible.

In the course of the third method step the at least one reinforcement 91 can be arranged such that the at least one reinforcement 91 has a lateral protrusion 95 beyond a side of the at least one layer 34, 35, 36 of the at least one particulate aggregate 31. Such protrusions, which serve in particular to connect the components to further components, can only be achieved with an enormous effort in conventional plants, in which formworks are used.

After the prefabricated part 54 produced has been unpacked from loose, unbound particulate aggregate 31, printed openings 111, achieved without formworks, remain, e.g. as window block-outs.

Figure 7A:
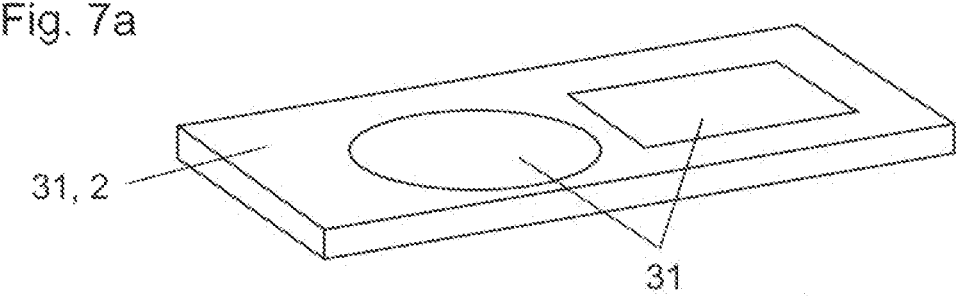
FIGS. 7a-d show a first embodiment of a method for producing a prefabricated 3D-printed part for the construction industry in schematically represented perspective views.
Figure 7B:
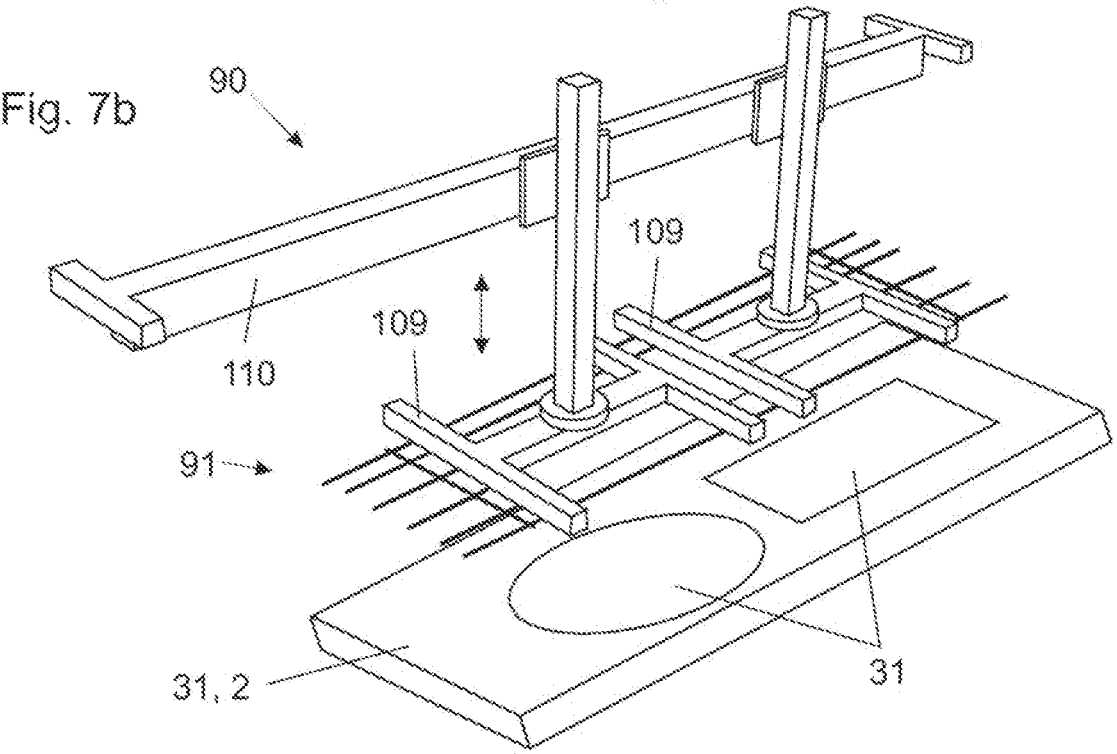
Figure 7C:
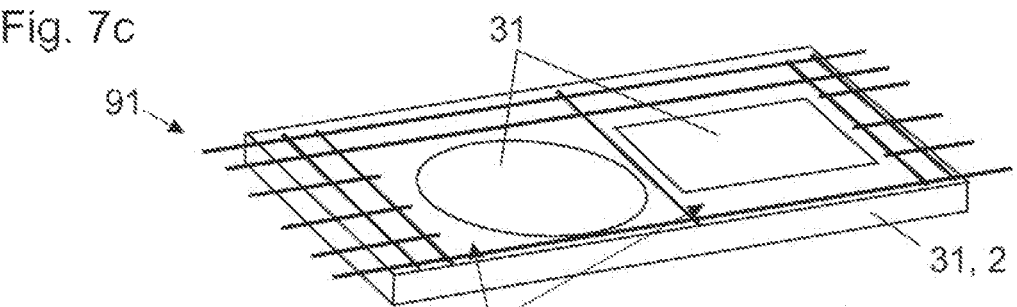

In FIG. 7b a reinforcement depositing device 90 is represented schematically, with which the at least one reinforcement 91 can be arranged at least in regions on and/or in at least the at least one locally predetermined region 33, at which the predetermined dose 49 of the at least one binder or the at least one water-binder mixture 2 was delivered in the course of the second method step. The reinforcement depositing device 90 can have e.g. two grippers 109, which are mounted movably along a carrier 110.

Figure 7D:
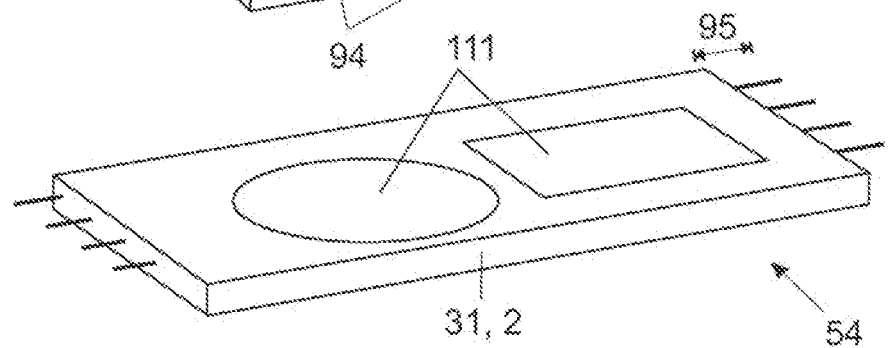

FIG. 8 shows a further embodiment of a printed concrete prefabricated component 54, which has, in addition to an upper layer which corresponds to the concrete prefabricated component 54 represented in FIG. 7d, a lower layer without reinforcement 91 and a layer arranged in between made of an insulation material 70 printed with it.

FIGS. 9a and 9b show further embodiments of a printed concrete prefabricated component 54, in which reinforcements 91 in the form of lifting anchors are incorporated. These can be arranged, as represented, standing out or sunk in a printed pocket.

FIG. 10 shows a further embodiment of a printed concrete prefabricated component 54 in the form of a double wall. The double wall has two side elements 82 spaced apart from each other which are connected to each other via at least one reinforcement 91.

The two side elements 82 can either be printed separately on two production pallets 32 and then joined together or be printed in the course of a single printing process on one production pallet 32.

FIG. 11 shows a further embodiment of a printed concrete prefabricated component 54 with a layer made of insulation material 70. In this case, it is a loose, i.e. unbound, insulation material.

The concrete prefabricated component 54 can be produced in that in a further method step unbound particulate aggregate 31 is removed, preferably extracted, at least in one region and in a further method step at least one insulation material 70 is deposited by at least one further layer depositing device 30 in the region in which the unbound particulate aggregate 31 was removed.

The sides of the concrete prefabricated component 54 can be closed by printed side walls or other measures, so that the loose insulation material 70 cannot leak out of the concrete prefabricated component 54.

FIG. 12 shows a further embodiment of a printed concrete prefabricated component 54 with printed block-out 112 for in-wall sockets, block-out 113 for a roller blind control, block-outs 114 for in-wall electrical wires and block-outs 115 for switches.

Figure 13A:
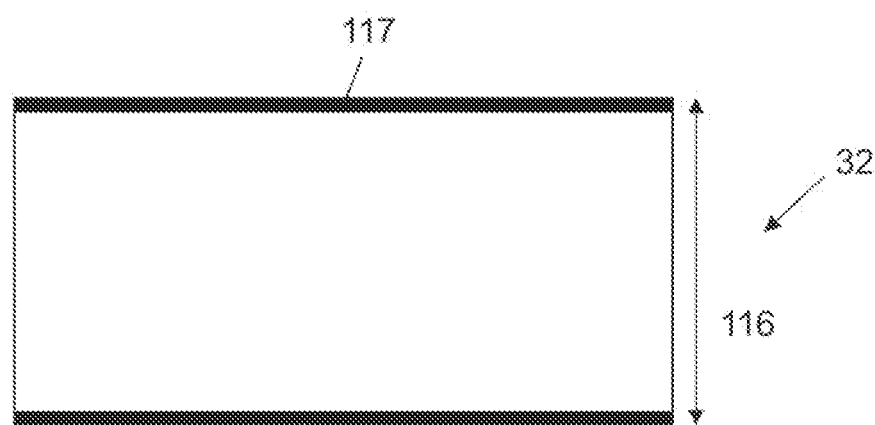
Figure 13B:
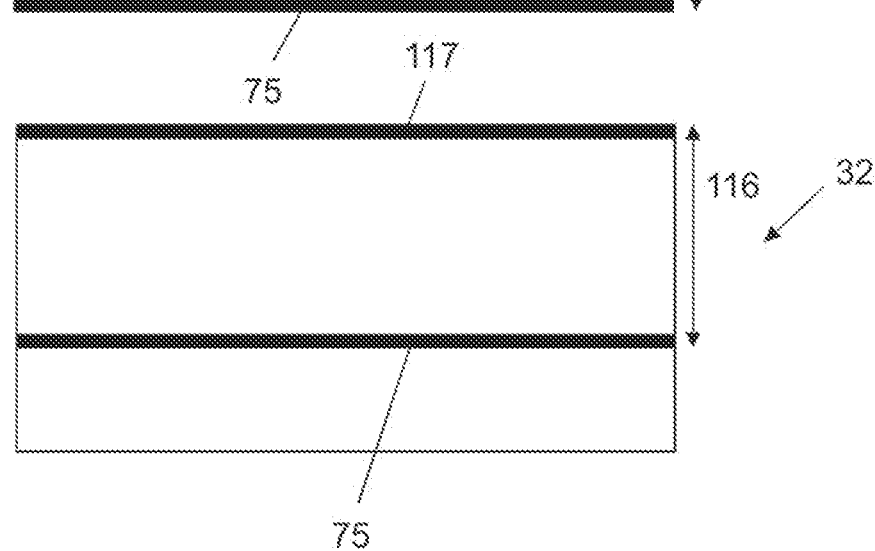

FIGS. 13a and 13b show a first embodiment of a production pallet 32, which comprises a fixed side limit 117 and a, e.g. manual, side limit 75. In this way, a width 116 of the printable region can be altered. This can make sense for example when a smaller prefabricated component is to be printed.

Figure 14A:
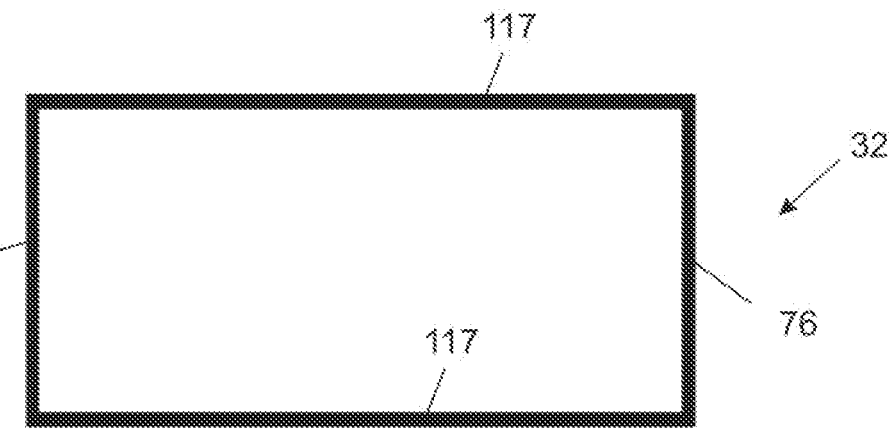
Figure 14B:
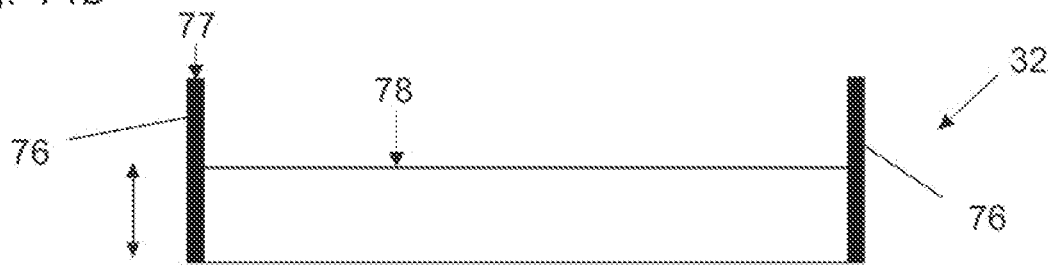

FIGS. 14a and 14b show a further embodiment of a production pallet 32, wherein the production pallet 32 comprises two height-adjustable side limits 76, wherein the height-adjustable side limits 76 can in each case be brought into a first position on the production pallet 32, in which the side limits 76 laterally delimit a volume that can be printed on the production pallet 32, and into at least one second position, in which a top 77 of the side limits 76 is substantially aligned with a top 78 of the production pallet 32.

Figure 15:
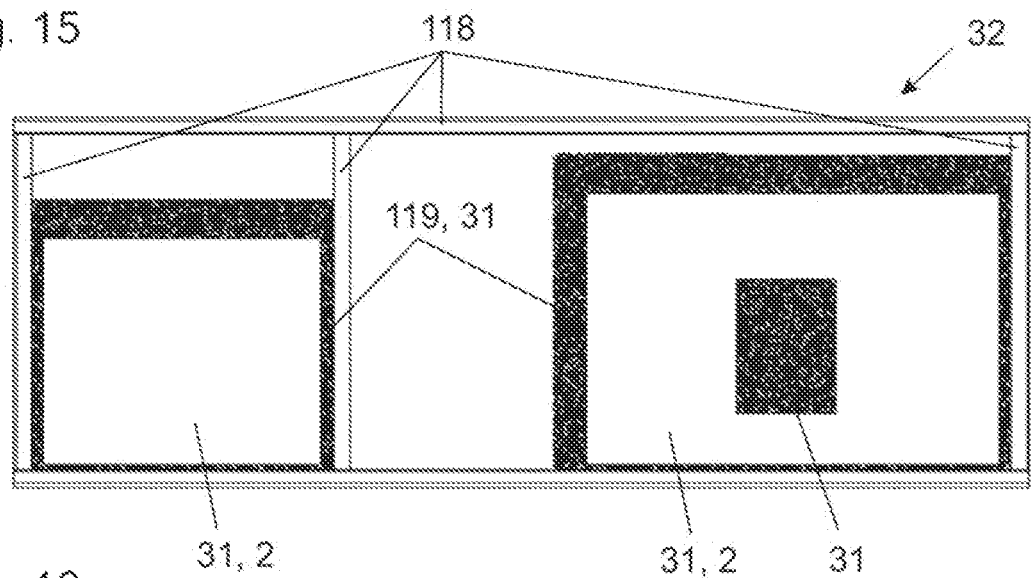
FIG. 15 shows a further embodiment of a production pallet with two printed regions in a schematically represented top view.

FIG. 15 shows a further embodiment of a production pallet 32 with two printed regions. Limits 118 are present which can be formed fixed, displaceable or height-adjustable.

A lateral limit of a printed prefabricated component, however, need not necessarily be effected by limits in the form of separate limit elements. A lateral limit can also be formed from the at least one particulate aggregate 31 in the form of debris cones 119 in the course of a printing process.

Figure 16:
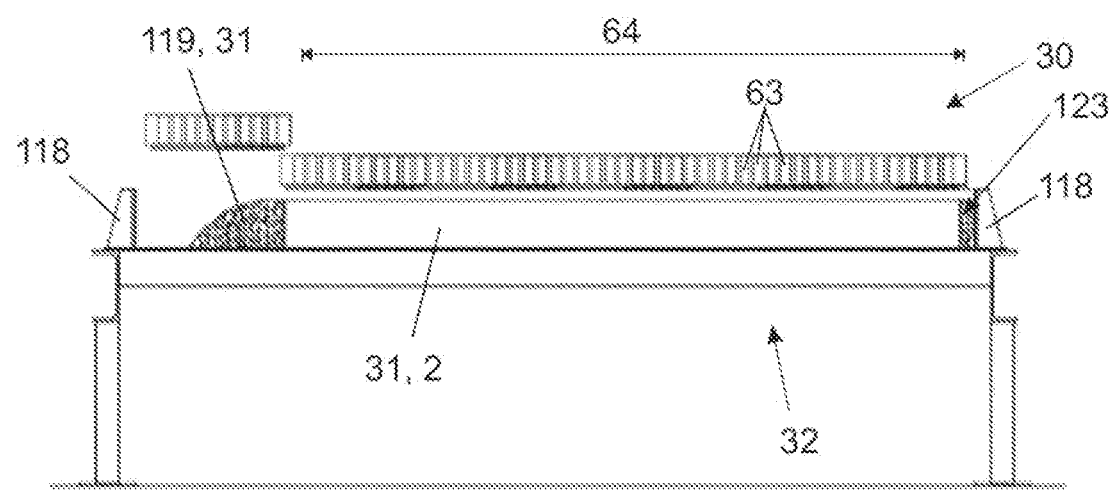
FIG. 16 shows a further embodiment of a production pallet and a layer depositing device in a schematically represented cross-sectional view from the side.

FIG. 16 shows a further embodiment of a production pallet 32 and a layer depositing device 30 in a schematically represented cross-sectional view from the side.

In order to generate a side face 123 that is as smooth as possible of a prefabricated component to be printed, a nozzle distance of a printhead 1 to a lateral limit can be chosen to be as small as possible. In the ideal case, an almost formwork-smooth side face 123 can be generated in this way.

It is appropriate that the layer depositing device 30, as in the case represented, has several segments 63, which are individually activatable and deactivatable in order to achieve a predetermined, i.e. variably settable, layer depositing width 64. In this connection, it is appropriate that the layer depositing device 30 has inner and/or outer partitions.

Analogously, the print bar can be formed in several parts and has individually activatable and deactivatable printheads 1 in order to achieve a predetermined printing width.

Figure 17:
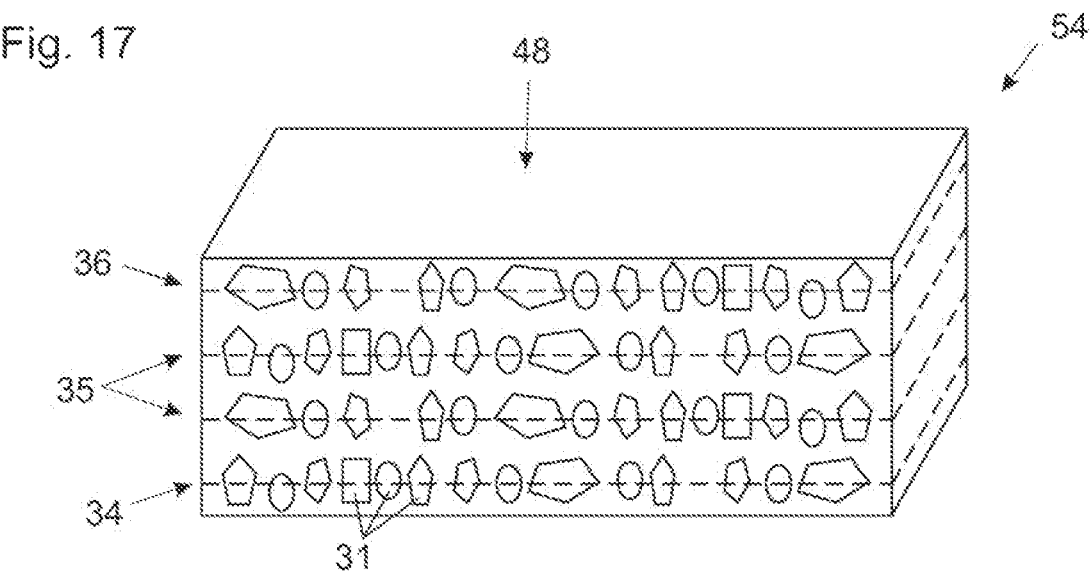
FIG. 17 shows a further schematically represented embodiment of a concrete prefabricated component in a perspective view.

FIG. 17 shows a further embodiment of a concrete prefabricated component 54, produced according to a method described above. Layers 34, 35, 36 of the at least one particulate aggregate 31 are deposited on the production pallet 32 by the at least one layer depositing device 30. The layers 34, 35, 36 are indicated by dashed lines. A predetermined dose 49 of the water-binder mixture 2 is delivered at locally predetermined regions 33 of the layers 34, 35, 36 of the at least one aggregate 31 by the printhead 1.

In the concrete prefabricated component 54 represented, a predetermined dose 49 of the at least one water-binder mixture 2 is delivered at least one locally predetermined region 33 of the printing platform 32 before a first layer 34 of the at least one aggregate 31 is deposited on the production pallet 32, and a predetermined dose 49 of the water-binder mixture 2 is delivered at least one locally predetermined region 33 of the last layer 36 of the at least one aggregate 31 after a last layer 36 of the at least one aggregate 31 has been deposited. In this way, very smooth surfaces 48 which are smooth in a similar way to the surfaces that can be generated in the conventional manner by formworks can be generated on the top and bottom of the concrete prefabricated component 54.

Figure 18:
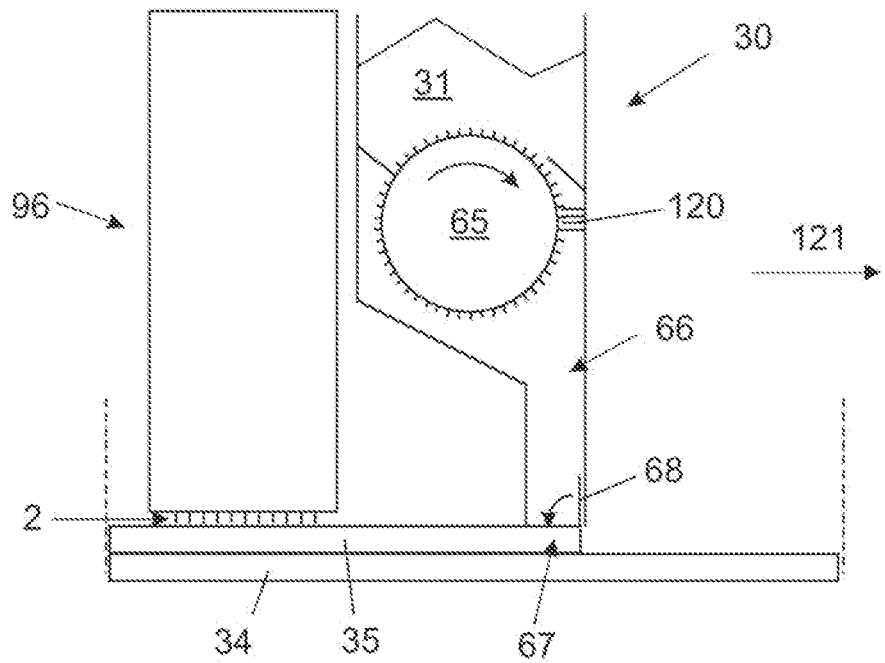
FIG. 18 shows an embodiment of a print bar and a layer depositing device of a 3D printing station in a schematically represented cross-sectional view from the side.

FIG. 18 shows an embodiment of a print bar 30 and a layer depositing device 30 of a 3D printing station in a schematically represented cross-sectional view from the side.

The layer depositing device 30 comprises a metering roller 65, via which the at least one particulate aggregate 31 can be applied to the at least one production pallet 32.

A removal device 120, e.g. in the form of a brush, is provided, with which the at least one particulate aggregate 31 can be removed, metered, from the metering roller 65.

The metering roller 65 can also be formed in several parts.

A depositing funnel 66 is provided, which can be made to vibrate with at least one vibration device, with the result that a twisting of coarse-grained material can be prevented.

The layer depositing device 30 comprises at least one delivery opening 67 and at least one metering flap 68, with which the at least one delivery opening 67 can be closed to different extents, with the result that a delivered quantity of the at least one particulate aggregate 31 can be metered.

The movement direction of the print bar 30 and the layer depositing device 30 is labeled with the reference number 121.

The print bar 30 and the layer depositing device 30 or at least a part of the layer depositing device 30 can be raised and lowered individually and independently of each other.

Figure 19:
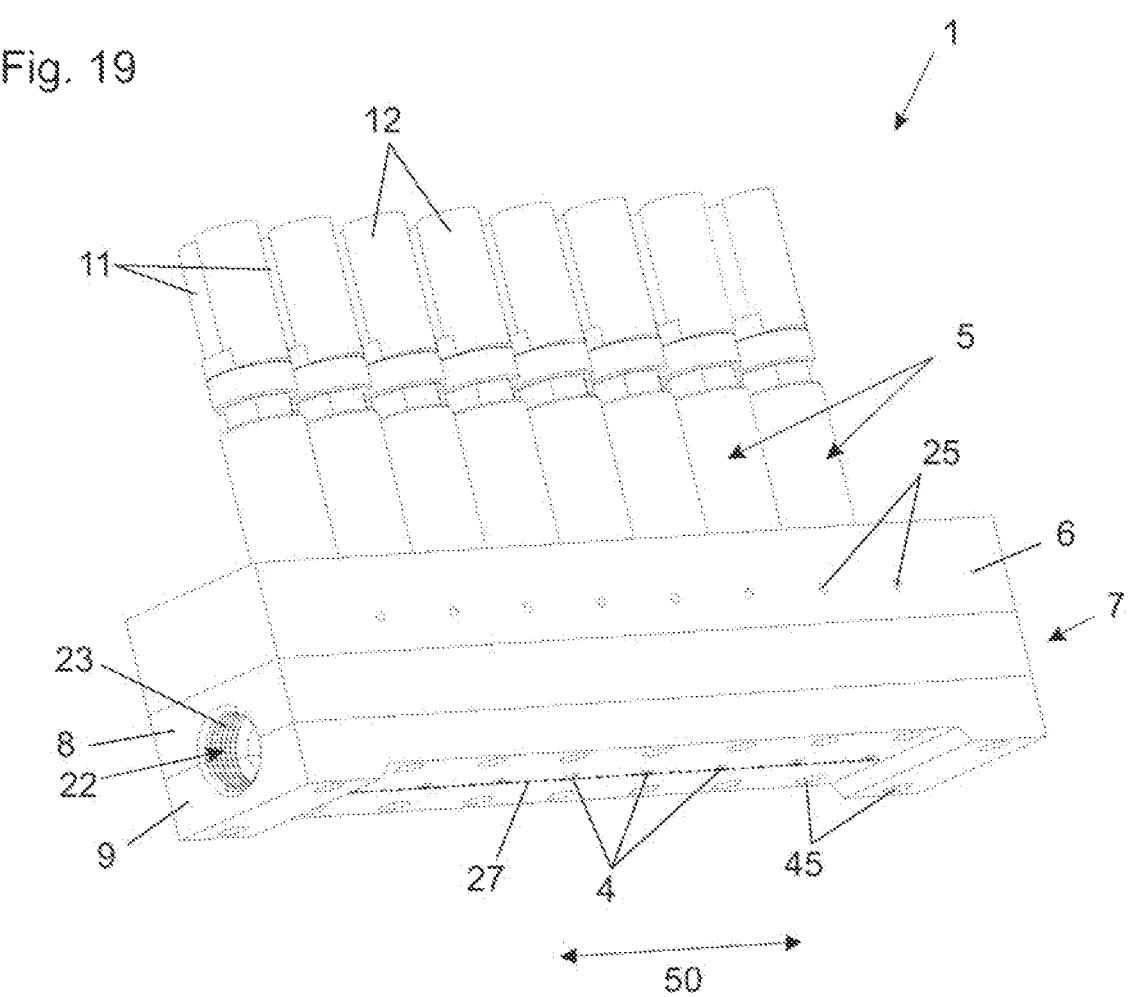
FIG. 19 shows a schematically represented embodiment of a printhead for the controlled delivery of a water-binder mixture in a perspective view.

FIG. 19 and the subsequent figures show a schematically represented embodiment of a printhead 1 for the controlled delivery of a water-binder mixture 2, comprising water and at least one hydraulic binder, in particular a cement-based binder. The printhead 1 comprises a feed channel 3 for feeding the water-binder mixture 2 in, several outlet openings 4, which can be brought into fluid connection with the feed channel 3, and several valves 5, with which the outlet openings 4 can be opened and closed in a controlled manner, whereby a predetermined dose 49 of the water-binder mixture 2 can be delivered through the outlet openings 4.

The outlet openings 4 are arranged equidistant on a line 27.

The valves 5 are formed as electropneumatic valves and in each case have a compressed-air connection 11 and an electrical connection 12. Via the compressed-air connection 11, the valve 5 can be supplied with compressed air, with which a cylinder 47, which is connected in a movement-coupled manner to a valve rod 14, can subsequently be actuated, cf. also FIG. 22b.

The valves 5 in each case have a valve rod 14, preferably made of at least one hard metal, preferably adjustable over an adjusting range 13 of between 0.5 and 1.5 mm. The adjusting range 13 is represented in FIG. 24b.

The valve rods 14 can, as in the case represented, have a free end 15, which is formed in the shape of a spherical head.

The valves 5 can comprise at least one return spring 16, preferably wherein the at least one return spring 16 is formed such that the allocated outlet opening 4 can be closed with a closing force of between 10 and 50 N, particularly preferably with a closing force of between 20 and 40 N. Such a return spring is represented schematically in FIG. 22b.

The valves 5 can have a bearing 46 for the valve rod 14, wherein the bearing 46 can, as in the case represented, be formed in the shape of a sleeve. The bearing 46 surrounds the valve rod 14 and the valve rod 14 moves relative to the bearing 46.

For each valve 5a, preferably replaceable, seal membrane 17 is provided, which seals the valve rod 14 against a penetration of the water-binder mixture 2. In the specific case, the seal membrane is arranged in a sealing manner between the valve rod 14 and the bearing 46.

Figure 22A:
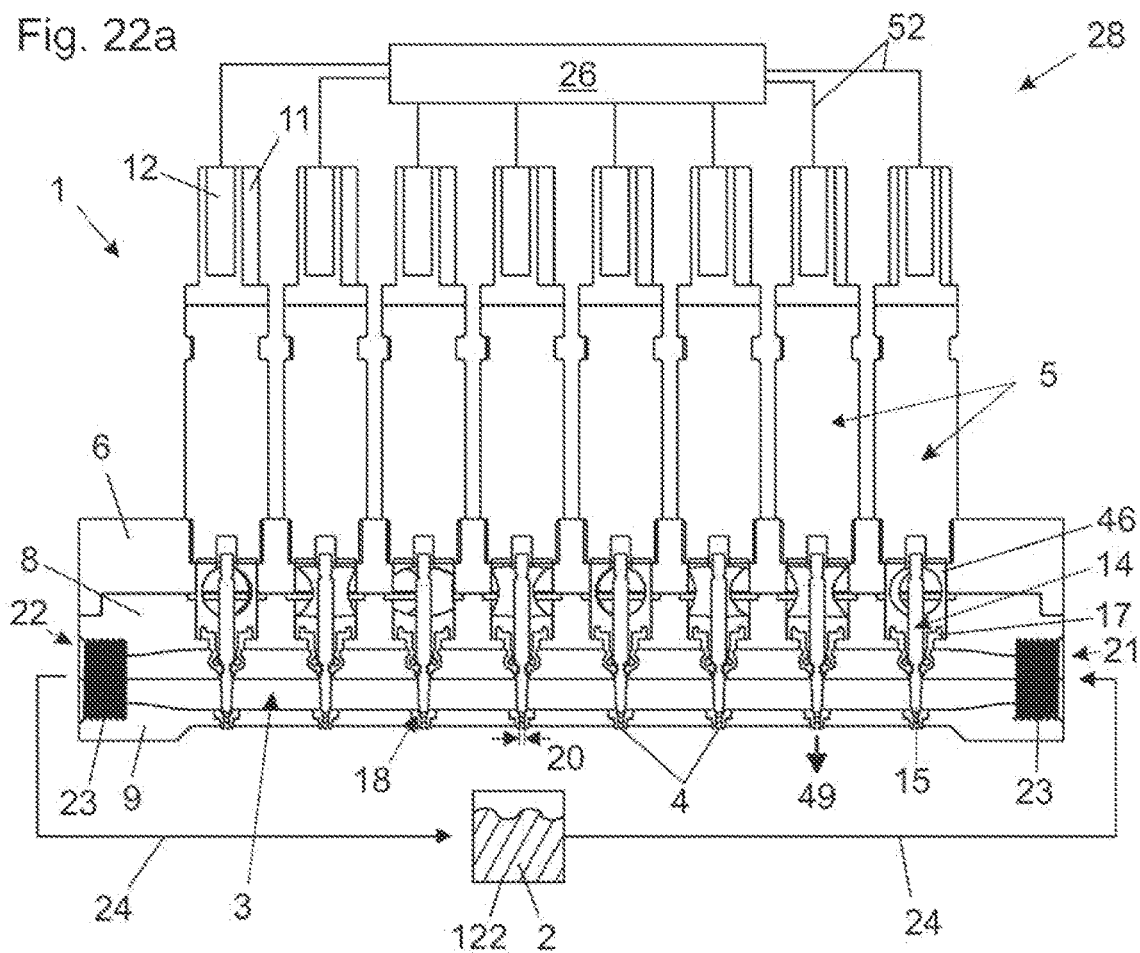
FIG. 22a shows a schematically represented embodiment of an arrangement with a water-binder mixture, comprising water and at least one hydraulic binder, in particular a cement-based binder, and a printhead for the controlled delivery of the water-binder mixture in a cross-sectional view along a cross-sectional plane parallel to a longitudinal axis of the printhead.
Figure 22B:
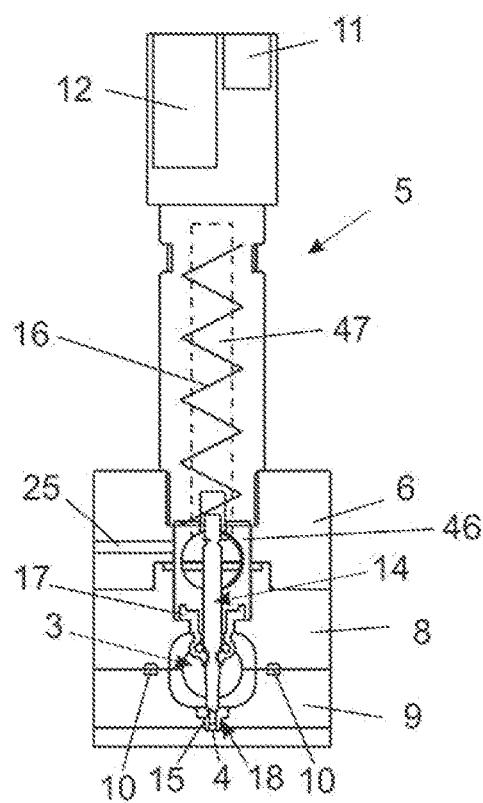
FIG. 22b shows the embodiment of the printhead represented in FIG. 19 in a cross-sectional view along a cross-sectional plane perpendicular to a longitudinal axis of the printhead.

The printhead 1 has several air-exhaust channels 25, with which a pressure equalization can be generated for the valve rods 14, cf. also FIG. 22b. Without the air-exhaust channels 25, there is the danger that a negative pressure, by which a part of the water-binder mixture 2 is sucked in and thereby penetrates into the valve 5, will develop on the side of the seal membrane 17 facing the valve 5.

Figure 20A:
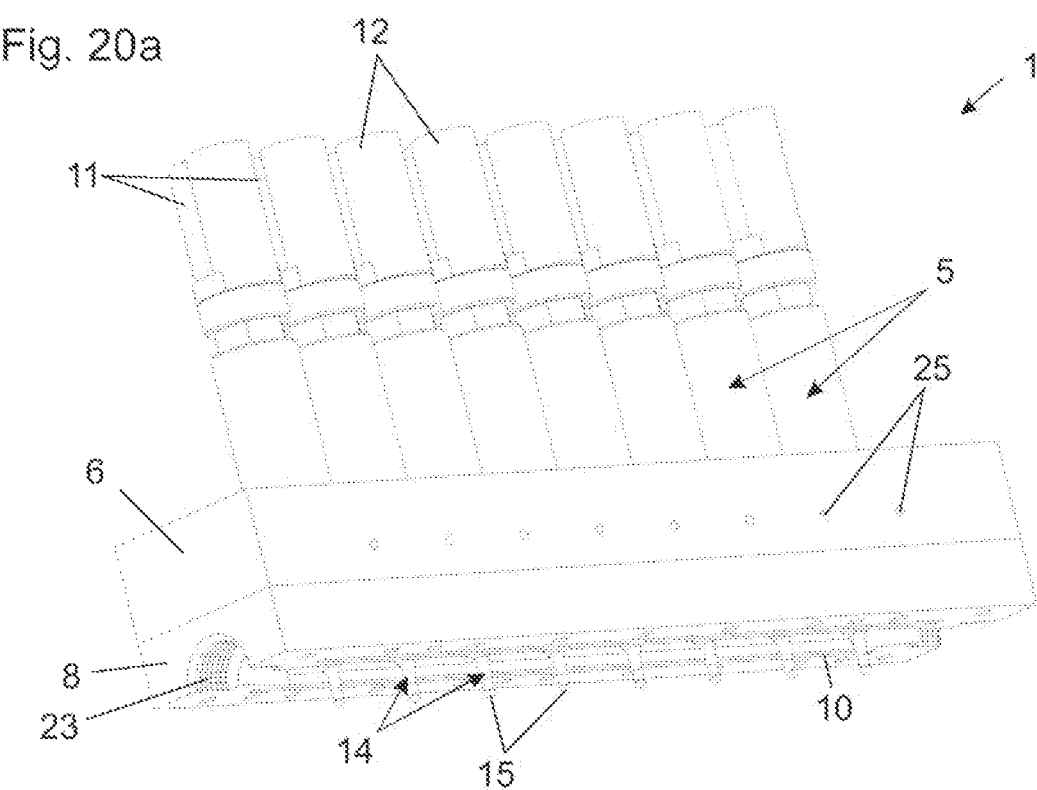
FIG. 20a shows the embodiment of the printhead represented in FIG. 19, wherein a first partial body of a removable body has been hidden.
Figure 20B:
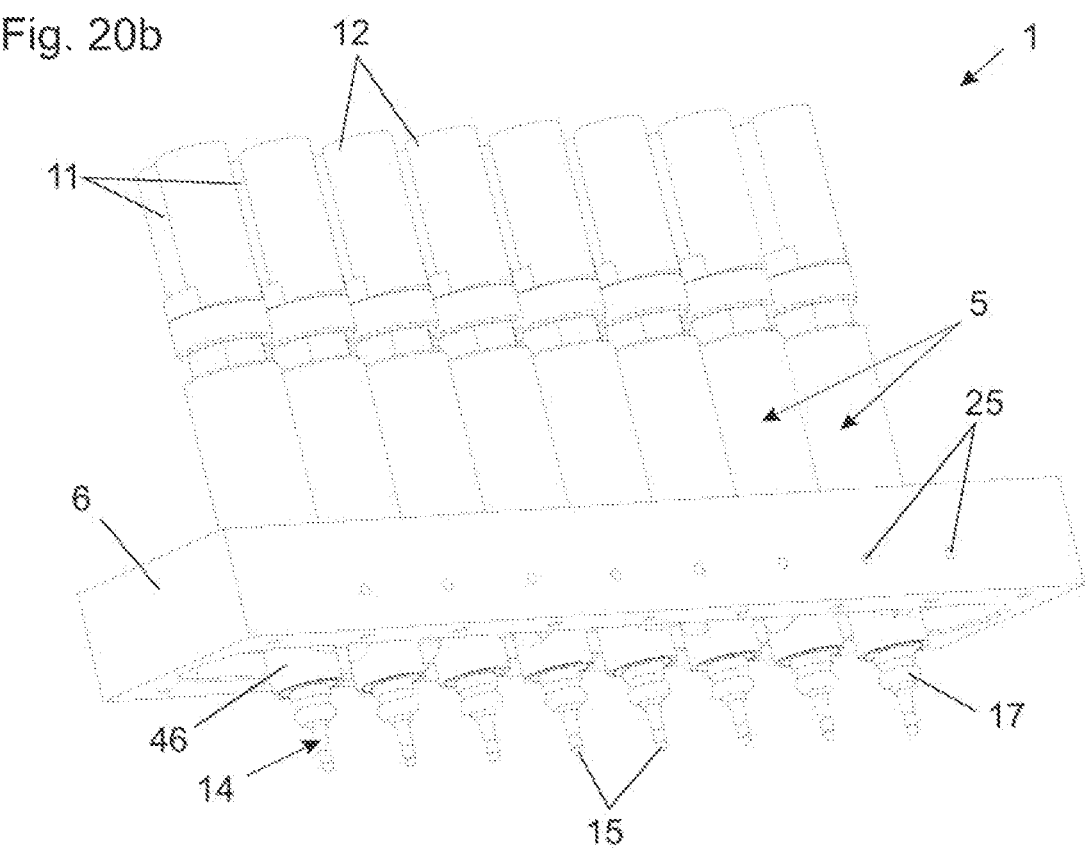
FIG. 20b shows the embodiment of the printhead represented in FIG. 19, wherein a first and a second partial body of a removable body have been hidden.

With reference to FIGS. 20a and 20b, it is particularly easily recognizable that the printhead 1 has a base body 6, on which the valves 5 are arranged, and a removable body 7 releasably connectable to the base body 6, wherein the outlet openings 4 and the feed channel 3 are arranged on the removable body 7. For the releasable connection of the removable body 7 on the base body 6, fastening device 45 can be provided (cf. FIG. 19), which can, as in the case represented, be formed as screws which engage in threads which are formed in the base body 6.

The removable body 7 consists of at least one acid-resistant plastic, preferably selected from a group consisting of PE, PVC, POM, PTFE and mixtures thereof and comprises at least one injection-molded part.

The removable body 7 has two partial bodies 8, 9 releasably connectable to each other, preferably wherein a seal 10 is arranged between the two partial bodies 8, 9 (cf. FIGS. 20a and 22b).

FIG. 22a shows a schematically represented embodiment of an arrangement 28 with a water-binder mixture 2, comprising water and at least one hydraulic binder, in particular a cement-based binder, and a printhead 1 for the controlled delivery of the water-binder mixture in a cross-sectional view along a cross-sectional plane parallel to a longitudinal axis 50 of the printhead 1. The longitudinal axis 50 is drawn in by way of example in FIG. 2.

The printhead 1 is formed according to the previously described preferred embodiment.

The at least one hydraulic binder is selected from a group consisting of Portland cement, calcium aluminate cement, calcium sulfoaluminate cement and mixtures thereof.

The water-binder mixture 2 comprises an additive in the form of a superplasticizer.

The feed channel 3 has an inlet opening 21 for the water-binder mixture 2, wherein the feed channel 3 has an outlet opening 22 lying opposite the inlet opening 21. The inlet opening 21 and the outlet opening 22 in each case have a thread 23 for the connection of a fluid line 24.

The water-binder mixture 2 can be arranged in an intermediate tank 122. The fluid lines 24 connect the intermediate tank 122 to the feed channel 3 of the printhead 1.

A control and/or regulating device (i.e., controller) 26 is provided, with which the valves 5 of the printhead 1 can be controlled. The control and/or regulating device 26 is connected in each case to the electrical connection 12 of the valves 5 via wires 52.

By means of the arrangement 28, a method for the controlled delivery of a water-binder mixture 2, comprising water and at least one hydraulic binder, in particular a cement-based binder, can be carried out, wherein the method comprises the following method steps: the water-binder mixture 2 is fed to the outlet openings 4 of printhead 1 via the feed channel 3 of the printhead 1, preferably with a pressure of between 0.1 and 2.0 bar, and the outlet openings 4 are opened and closed in a controlled manner by the valves 5 of the printhead 1 and a predetermined dose 49 of the water-binder mixture 2 is thereby delivered through the outlet openings 4.

FIGS. 23, 24a, 24b, 25 and 26 show details of an embodiment of a valve 5 of the printhead 1 for the controlled delivery of a water-binder mixture 2 as well as a nozzle body 18 cooperating with the valve rod 14 of the valve 5, in which the outlet opening 4 is formed. The diameter 20, cf. FIG. 22a, of the outlet opening 4 is between 0.5 and 2.0 mm.

The nozzle body 18 is formed of at least one hard metal or ceramic, and has an inclined contact surface 19 for a free end 15 of the valve rod 14 of the valve 5. The inclined contact surface 19 can, as in the case represented, be formed in the shape of a funnel.

The invention claimed is:

1. A plant for producing a concrete prefabricated component, the plant comprising:
    a plurality of stations configured to allow a production pallet to pass therethrough in a circulating manner,
    a transport system configured to transport the production pallet through the plant,
    a water-binder mixture comprising water and a hydraulic cement-based binder,
    a mixing device configured to mix the water-binder mixture,
    a 3D printing station including:
        a layer depositing device configured to deposit layers of a particulate aggregate on the production pallet, and
        a printhead configured for controlled delivery of the water-binder mixture to at least one of the layers of the particulate aggregate deposited on the production pallet by the layer depositing device, to form a concrete prefabricated component,
    a storage device configured to store the particulate aggregate,
    a conveying device configured to convey the particulate aggregate stored in the storage device to the layer depositing device of the 3D printing station,
    a feed device configured to feed the water-binder mixture from the mixing device to the printhead of the 3D printing station, and
    an unpacking station configured to separate the concrete prefabricated component printed on the production pallet in the 3D printing station from an unbound portion of the particulate aggregate.

2. The plant according to claim 1, further comprising:
    a cement storage device configured to store cement, and/or
    a bag loading station for loading cement bags, wherein the cement storage device and/or the bag loading station are in cement-channeling connection with the mixing device.

3. The plant according to claim 1, wherein the layer depositing device of the 3D printing station includes:
    a plurality of segments individually activatable and deactivatable to achieve a predetermined layer depositing width, and/or
    a metering roller configured to apply the particulate aggregate to the production pallet, and/or
    a depositing funnel, and/or
    a delivery opening and a metering flap configured to close the delivery opening to different extents to meter a delivered quantity of the particulate aggregate.

4. The plant according to claim 1, wherein the layer depositing device is a first layer depositing device, the 3D printing station further including a second layer depositing device for depositing layers of an insulation material, and/or the plant further comprises a suction device for extracting unbound particulate aggregate.

5. The plant according to claim 1, wherein the production pallet:
is configured such that a length of the 3D printing station is at least twice as large as a length of the production pallet, and/or
comprises a side limit displaceable on the production pallet, and/or
comprises a height-adjustable side limit.

6. The plant according to claim 1, further comprising a drying station configured to cure the concrete prefabricated component printed on the production pallet arranged in the drying station.

7. The plant according to claim 1, wherein the unpacking station comprises:
a tilting device, and/or
a removal device for removing the unbound portion of the particulate aggregate, and/or
a recirculation device configured to feed back the unbound portion of the particulate aggregate into the storage device, and/or
a separating device configured to separate the particulate aggregate from another substance applied to the production pallet by the 3D printing station.

8. The plant according to claim 1, wherein the plant:
further comprises a preparation station configured to prepare the production pallet, and/or
is free of any formwork robots, and/or
further comprises a holding area configured to hold the production pallet.

9. The plant according to claim 1, further comprising a straightening machine, a reinforcement welding device, and/or a reinforcement depositing device configured to arrange a reinforcement on the production pallet in the 3D printing station.

10. The plant according to claim 1, wherein the 3D printing station further includes:
at least two guide rails configured to guide the layer depositing device and/or the printhead in a plane parallel to the production pallet, and/or
a height-adjustment device configured to adjust a distance of the layer depositing device, a part of the layer depositing device, or the printhead from the production pallet arranged in the 3D printing station in the vertical direction depending on a print advancement.

11. The plant according to claim 1, wherein the printhead of the 3D printing station comprises a feed channel configured to feed the water-binder mixture to an outlet opening in fluid connection with the feed channel, and comprises a valve configured to open and close the outlet opening in a controlled manner to deliver a predetermined dose of the water-binder mixture through the outlet opening.

12. The plant according to claim 11, wherein:
the printhead includes a base body on which the valve is arranged, and a removable body releasably connectable to the base body, wherein the outlet opening and/or the feed channel are arranged in the removable body, and/or
the printhead includes a replaceable seal membrane a movable part of the valve against a penetration of the water-binder mixture, and/or
the outlet opening is formed in a nozzle body, and/or
the feed channel has an inlet opening for receiving the water-binder mixture, preferably wherein the at least one feed channel has at least one outlet opening lying opposite the at least one inlet opening, particularly preferably wherein the at least one inlet opening and/or the at least one outlet opening has a thread for the connection of a fluid line, and/or
the printhead has an air-exhaust channel to achieve a pressure equalization for the movable part of the valve, and/or
the plant further comprises a controller configured to control the valve, and/or
the printhead comprises a plurality of outlet openings arranged on a line.

13. The plant according to claim 1, wherein:
the hydraulic binder is selected from a group consisting of Portland cement, calcium aluminate cement, calcium sulfoaluminate cement, and mixtures thereof, and/or
the water-binder mixture comprises an additive.

14. A method for producing a concrete prefabricated component using the plant according to claim 1, the method comprising:
depositing a layer of the particulate aggregate on the production pallet in the 3D printing station by the layer depositing device, and
delivering a predetermined dose of the water-binder mixture to a locally predetermined region of the layer of the particulate aggregate by the printhead to form the concrete prefabricated component,
conveying the particulate aggregate from the storage device to the layer depositing device of the 3D printing station by the conveying device,
mixing the water-binder mixture in the mixing device, and feeding the water-binder mixture to the printhead of the 3D printing station by the feed device,
transporting the production pallet from the 3D printing station to the unpacking station by the transport system, and
separating the concrete prefabricated component printed on the production pallet in the 3D printing station from the unbound portion of the particulate aggregate in the unpacking station.

15. The method according to claim 14, wherein:
wherein the predetermined dose of the water-binder mixture is delivered to the locally predetermined region of the printing platform before a first layer of the particulate aggregate is deposited on the production pallet, and/or
wherein the predetermined dose of the water-binder mixture is delivered to the locally predetermined region of a last layer of the particulate aggregate after depositing a last layer of the particulate aggregate.

16. The method according to claim 14, wherein a plurality of concrete prefabricated components formed as wall or ceiling elements for buildings are produced by the method.

17. The method according to claim 14, wherein the plant further comprises a holding area for holding the production pallet, and the method further comprising transporting the production pallet from the holding area to the 3D printing station by the transport system.

18. The method according to claim 14, further comprising providing an outside of the concrete prefabricated component with a predetermined surface structure during the delivering of the predetermined dose of the water-binder mixture to the locally predetermined region of the layer of the particulate aggregate.

19. The method according to claim 14, wherein the depositing of the layer of the particulate aggregate on the production pallet and the delivering of the predetermined dose of the water-binder mixture to the locally predetermined region of the layer of the particulate aggregate are repeated and/or carried out in reverse order.

20. The plant according to claim 3, wherein the layer depositing device of the 3D printing station includes the depositing funnel and a vibration device configured to vibrate the depositing funnel.

21. The plant according to claim 4, wherein the storage device is a first storage device and the conveying device is a first conveying device, the plant further comprising a second storage device configured to store the insulation material, and a second conveying device configured to convey the insulation material stored in the second storage device to the second layer depositing device.

22. The plant according to claim 5, wherein the production pallet comprises the height-adjustable side limit configured to be brought into a first position on the production pallet, whereat the height-adjustable side limit laterally delimits a volume to be printed on the production pallet, and into a second position on the production pallet, whereat a top of the height-adjustable side limit is aligned with a top of the production pallet.

23. The plant according to claim 6, wherein the drying station:
comprises a heating device, and/or
comprises a pallet rack configured to allow stacking of two production pallets one above another in the drying station, and/or
is downstream of the 3D printing station with respect to a direction of production of the concrete prefabricated component.

24. The plant according to claim 7, wherein the unpacking station comprises the separating device, and the separating device includes a sieve and/or an air separator.

25. The plant according to claim 8, wherein the plant further comprising the preparation station, and the preparation station includes a cleaning agent and/or a release agent spraying device.

26. The plant according to claim 12, wherein:
the movable part of the valve is a valve rod,
the nozzle body has an inclined, funnel-shaped, contact surface for abuting a free end of a valve rod of the valve,
the feed channel further has an outlet opening opposite the inlet opening, and the inlet opening and/or the at least one outlet opening has a thread for connection of a fluid line, and
the plurality of outlet openings are arranged equidistant on the line.

27. The plant according to claim 13, wherein the additive is a superplasticizer.

* * * * *